United States Patent [19]

Pelly et al.

[11] Patent Number: 5,436,786
[45] Date of Patent: Jul. 25, 1995

[54] ISOLATOR SURGE PROTECTOR FOR DC ISOLATION AND AC GROUNDING OF CATHODICALLY PROTECTED SYSTEMS

[75] Inventors: Brian R. Pelly, Palos Verdes Estates, Calif.; Henry N. Tachick, Pound, Wis.

[73] Assignee: Dairyland Electrical Industries, Inc., Oregon, Wis.

[21] Appl. No.: 994,516

[22] Filed: Dec. 21, 1992

[51] Int. Cl.⁶ .............................................. H02H 9/04
[52] U.S. Cl. ...................................... 361/56; 361/111; 361/91
[58] Field of Search ...................... 361/8, 13, 6, 56, 86, 361/91, 111; 367/633

[56] References Cited

U.S. PATENT DOCUMENTS

| | | |
|---|---|---|
| 2,087,340 | 7/1937 | Davis . |
| 3,198,989 | 8/1965 | Mahoney . |
| 3,213,349 | 10/1965 | Gutzwiller . |
| 3,571,660 | 3/1971 | Phillips . |
| 3,904,931 | 9/1975 | Leidich . |
| 3,932,791 | 1/1976 | Oswald . |
| 3,997,818 | 12/1976 | Bodkin . |
| 4,117,345 | 9/1978 | Balcom ................................ 307/95 |
| 4,118,749 | 10/1978 | Matuzaki et al. . |
| 4,158,150 | 6/1979 | Dever .............................. 307/252 B |
| 4,186,418 | 1/1980 | Seiler ...................................... 361/56 |
| 4,217,618 | 8/1980 | Kellenbenz et al. ................... 361/56 |
| 4,237,509 | 12/1980 | Asplund ................................. 361/56 |
| 4,297,739 | 10/1981 | Goldin et al. .......................... 361/55 |
| 4,321,644 | 3/1982 | Brasfield ................................ 361/56 |
| 4,322,767 | 3/1982 | El Hamamsy et al. ................ 361/56 |
| 4,331,884 | 5/1982 | Svedberg ........................... 307/252 C |
| 4,475,139 | 10/1984 | Chadwick ............................. 361/91 |
| 4,491,742 | 1/1985 | Akamatsu ............................ 307/633 |
| 4,509,089 | 4/1985 | Svedberg ............................. 361/100 |
| 4,697,219 | 9/1987 | Mitsuoka ............................... 361/93 |
| 4,958,250 | 9/1990 | Kotski ................................... 361/40 |
| 5,155,674 | 10/1992 | Tanoue et al. ........................ 361/91 |

FOREIGN PATENT DOCUMENTS 1367890 9/1974 United Kingdom .
2160721 9/1985 United Kingdom .

OTHER PUBLICATIONS

Brochure by Kirk Engineering Co., Inc. describing the "Kirk Cell" electrolytic switch, 1989.
Brochure entitled "Rustrol Polarization Cell" by International Corrosion Control.
H. A. Cloud, et al., "Stray Voltage Problems With Dairy Cows," North Central Regional Extension Publication 125, Argicultural Extension Service University of Minnesota, 1980.
J. G. Kappenman, et al., "GIC Mitigation: A Neutral Blocking/Bypass Device to Prevent the Flow of GIC in Power Systems". No Date.
John G. Kappenman, et al., "Neutral Blocking Device Combats Currents Caused by Geomagnetic Storms". No Date.
Product brochure published by Dairyland Electrical Industries, Inc. for Solid-State Isolator/Surge Protector, published in the United States prior to Dec. 21, 1992.
Addendum to Isolator/Surge Protector Brochure by Dairyland Electrical Industries, Inc., published in the United States prior to Dec. 21, 1992.

Primary Examiner—Todd DeBoer
Attorney, Agent, or Firm—Foley & Lardner

[57] ABSTRACT

An isolator surge protector for use with corrosion protection systems which are an inherent part of or coupled to an electrical power system, for power transformers, and for DC transmission systems, where it is necessary to present a high impedance to DC and a low impedance to AC up to a predetermined voltage level. Anti-paralleled thyristors in the isolator surge protector turn on during power surges. A bypass circuit insures turn off of the thyristors after a triggering event such as lightning or a 60 Hz surge has ended. The bypass circuit shunts DC bias currents, such as that which may be provided by a DC bias voltage source for cathodic protection, from the thyristors to ensure that the voltage across each thyristor falls below its holding voltage or current, and thus prevents the thyristor from being stuck in a continuous conduction mode. Power to operate the bypass circuit may be tapped from the surge which caused the thyristor to trigger so that the bypass circuit operates autonomously. The circuit may also operate with an auxiliary power supply to provide the required operating power and to turn off the thyristors.

40 Claims, 19 Drawing Sheets

FIG. 3

CONCEPTUAL SCHEMATIC OF LOGIC AND MOSFET DRIVE CIRCUITRY FOR AUTONOMOUS UNIPOLAR BYPASS SWITCH

NOTE: COMPARATOR OUTPUT IS HIGH WHEN THE INPUT + TERMINAL IS POSITIVE WITH RESPECT TO THE INPUT – TERMINAL

FIG. 4 WAVEFORMS ILLUSTRATING THE OPERATION OF BYPASS SWITCH DURING A LIGHTNING STRIKE WITH DC FOLLOW CURRENT

ISOLATOR SURGE PROTECTOR FOR DC ISOLATION AND AC GROUNDING OF CATHODICALLY PROTECTED SYSTEMS

TECHNICAL FIELD

This invention pertains generally to the field of power distribution systems and apparatus therefor, and more particularly to isolator/surge protector circuits.

BACKGROUND OF THE INVENTION

Stray electrical currents associated with farm installations, particularly dairying equipment, can present a significant economic problem for farm operations. Dairy operations are susceptible to stray electricity because cows are extremely sensitive to electricity, much more so than humans, and will respond to potentials as low as one volt or less. Such problems are described in a report by H. A. Cloud et al. "Stray Voltage Problems with Dairy Cows" North Central Regional Extension Publication 125.

An advantageous solution to an aspect of the problem involves opening the link between the primary and secondary neutrals of the transformer serving the farm. However, this link must be closed very rapidly any time the voltage between the neutrals exceeds a predetermined level (i.e., as might be caused by a transformer failure, lightning surge, or other surge condition). In U.S. Pat. No. 4,958,250, issued to Kotski on Sep. 18, 1990, an isolator/surge protector is disclosed to mitigate the cause of stray voltage problems. An electronic switch circuit is disclosed which will close on 60 hertz (Hz) overvoltage conditions or ion lightning surges of several tens of thousands of amperes having rise times in the order of 1 to 10 microseconds. The high speed electronic switching apparatus which is connected between the primary and secondary neutrals of the distribution transformer normally provides a very high impedance between the primary and secondary neutrals to both AC and DC. These types of isolator/surge protectors are sometimes used with metallic systems which are cathodically protected by an external DC bias which prevents corrosion from being initiated. Unfortunately, this external DC bias can operate to hold the electronic switches of a surge protector in a conductive state once triggered by a surge event or transient event because the external DC bias may be greater than the turn OFF voltage of the switch. The external DC bias often holds the switch ON even though the event which caused the triggering condition has ended. In this condition, the switch is "stuck" in an ON state. Thus, the external DC bias can prevent proper operation of the isolator surge protector.

Isolator/surge protectors may also be used in systems which protect metallic structures against corrosion so that the metallic structures operate safely and experience failures less frequently. Many metallic structures and systems must be protected against corrosion. For example, metallic gas transmission and distribution lines must be protected against corrosion to prevent gas leaks, particularly in certain environments. Further, metal encased high-voltage underground transmission lines should be corrosion protected. Underground transmission lines commonly consist of three paper insulated conductors encased in a single metal pipe which is filled with oil and pressurized. Any small pinhole in the pipe due to corrosion can cause a cable failure (i.e., line-to-ground fault) causing considerable economic loss and customer complaints. Similar situations exist with many other metallic objects which can cause economic or safety concerns when allowed to corrode.

The most common method of corrosion protection of metallic systems is to make the system to be protected more negative in potential than any other metallic object with which it is in electrical contact. A common method to accomplish this is to insulate the object that is to be corrosion protected (e.g., such as by applying an insulating coating), and to isolate it from other objects. A negative DC potential is then applied to the system relative to ground, with typical values being in the 0.6 volt to 3.0 volt range. While this procedure may eliminate corrosion, it introduces a second problem if the corrosion protected system is an inherent part of a 60 Hz power system (or 50 Hz in European countries) or if it is coupled to such a power system through resistive, capacitive, or inductive coupling. In the event of a fault (e.g., a short circuit) within the power system, the electrically isolated, corrosion protected system may rise in voltage to unsafe levels, which is not acceptable. To prevent such corrosion protected systems from reaching unsafe voltage levels in the event of a fault, lightning, switching transient, or other system disturbance, it would be highly desirable if the corrosion protected system were connected to ground through a device that would present a high-impedance to DC, at least up to the DC voltage level of interest (which may be up to 10 volts when stray DC influences are considered), but presents a low impedance to AC at all times so that the voltage of the corrosion protected system is limited to values safe for personnel and equipment.

To date, such isolator/surge protector functions have been performed by a device known as a polarization cell, an electromechanical device which has the ability to present a relatively high impedance to DC (up to about 1.2 volts DC) and simultaneously present a low impedance to AC. Among the several problems with the polarization cells are that it is often necessary to connect several in series to isolate to the desired DC voltage level, it is an electromechanical device which requires routine maintenance and eventual disposal of the electrolyte, and the electrolyte is extremely caustic and hazardous.

An isolator surge protector (ISP) may also be used to isolate DC current and transmit AC current for power transformers which are not designed to accommodate a DC current flowing through the transformer windings. DC currents as low as several amperes can cause partial core saturation, resulting in excessive reactive power losses in the transformer (i.e., excessive heating), a drop in system voltage, the introduction of undesirable harmonics, and a significant increase in noise level. Sources of DC current that can cause this problem include geomagnetically induced currents caused by solar flares, stray DC current from rapid transit systems typically found in large cities, and stray DC current associated with high-voltage DC transmission systems particularly when operating in the monopolar mode (i.e., earth return mode). In such applications, it may be necessary to block up to 4,000 volts DC while simultaneously carrying up to 200 amperes AC, with the ability of the isolating device to carry power system fault currents up to 60,000 amperes and withstand lightning/switching transients, all while preventing hazardous voltages from being developed across the two points to which the ISP is connected. In other applications, an ISP may be used to prevent unsafe voltages between parts of corrosion protected systems (e.g., such as across an isolated flange in a gas pipeline).

SUMMARY OF THE INVENTION

The present invention provides a solid state alternative to the polarization cell which does not have any inherent limit on the DC voltage that can be isolated, does not require routine maintenance, and does not contain a hazardous electrolyte.

In accordance with the present invention, an isolator-surge protector includes a bypass circuit which short-circuits the high current capacity thyristors of the protector after the triggering event has ended. The bypass circuit shunts the current away from the thyristors so that the voltage across the thyristors falls below the holding voltages. Thus, the thyristors will not be permanently stuck in a conduction mode by the external DC bias.

The isolator surge protector of the invention can be autonomous so that it does not require an auxiliary source of electrical power. The power for operation is tapped from a condition that causes a trigger event. The autonomous feature is advantageous for applications in which an auxiliary power source is unavailable. In these applications, the ISP is a passive two terminal device that does not require any additional power source. If the current through the thyristor reaches a continuous DC level after a surge, a bypass switch in a turn-off circuit diverts the DC current from a thyristor for a sufficient time for the thyristor to turn off and regain its forward blocking capability after a triggering event. The condition for turning on the bypass switch may be when the voltage across the thyristor falls below a predetermined threshold after a selected period of time following the surge condition. Generally, a continous DC current will be considered to occur when current below a selected level flows through a turned-on thyristor for more than one full cycle of power from the AC power system, e.g., for more than a sixtieth of a second. After a predetermined period of time, the bypass switch is turned off, returning the ISP to a high impedance state. The turnoff circuit has a logic and drive circuit and a bypass switch coupled across a pair of thyristors. The logic and drive circuit turns ON the switch when a delayed signal falls below a predetermined level after the triggering event.

The ISP may also include a bipolar bypass switch. The bipolar bypass switch includes two unipolar bypass switches coupled in anti-parallel to provide a bypass function for both directions of current. A preferred embodiment includes a composite bipolar bypass circuit including two MOSFETs coupled in series opposition. Each MOSFET may include internal anti-parallel diodes integral within their structures.

A non-autonomous ISP in accordance with the present invention, which is particularly useful in high voltage ISP devices, includes a bias supply. The non-autonomous ISP may include at least one insulated gate bipolar transistor (IGBT) for providing a low impedance path across the terminals of the ISP. The IGBT in combination with the bias supply provides the diversionary path when drive pulses have not been delivered to the thyristors for a period of time sufficient to ascertain that a thyristor has become stuck in conduction, for example 100 milliseconds, and voltage across the thyristor is less than a first predetermined voltage but greater than a second predetermined voltage. The IGBT is driven ON for a brief period of time by a logic and drive circuit in response to these conditions and then turned OFF, thereby giving the thyristor time to recover its forward blocking capability and return the ISP to its normal blocking mode.

The ISP of the invention may also include a resistive shunt path for dissipating the inductive energy associated with the external DC power supply.

Further objects, features and advantages will be apparent from the following detailed description when taken in conjunction with the accompanying drawings.

BRIEF DESCRIPTION OF THE DRAWINGS

In the drawings:

FIG. 3 is a simplified schematic of the logic and drive circuitry for the autonomous isolator circuit of the present invention.

DETAILED DESCRIPTION OF THE INVENTION

Figure 1:
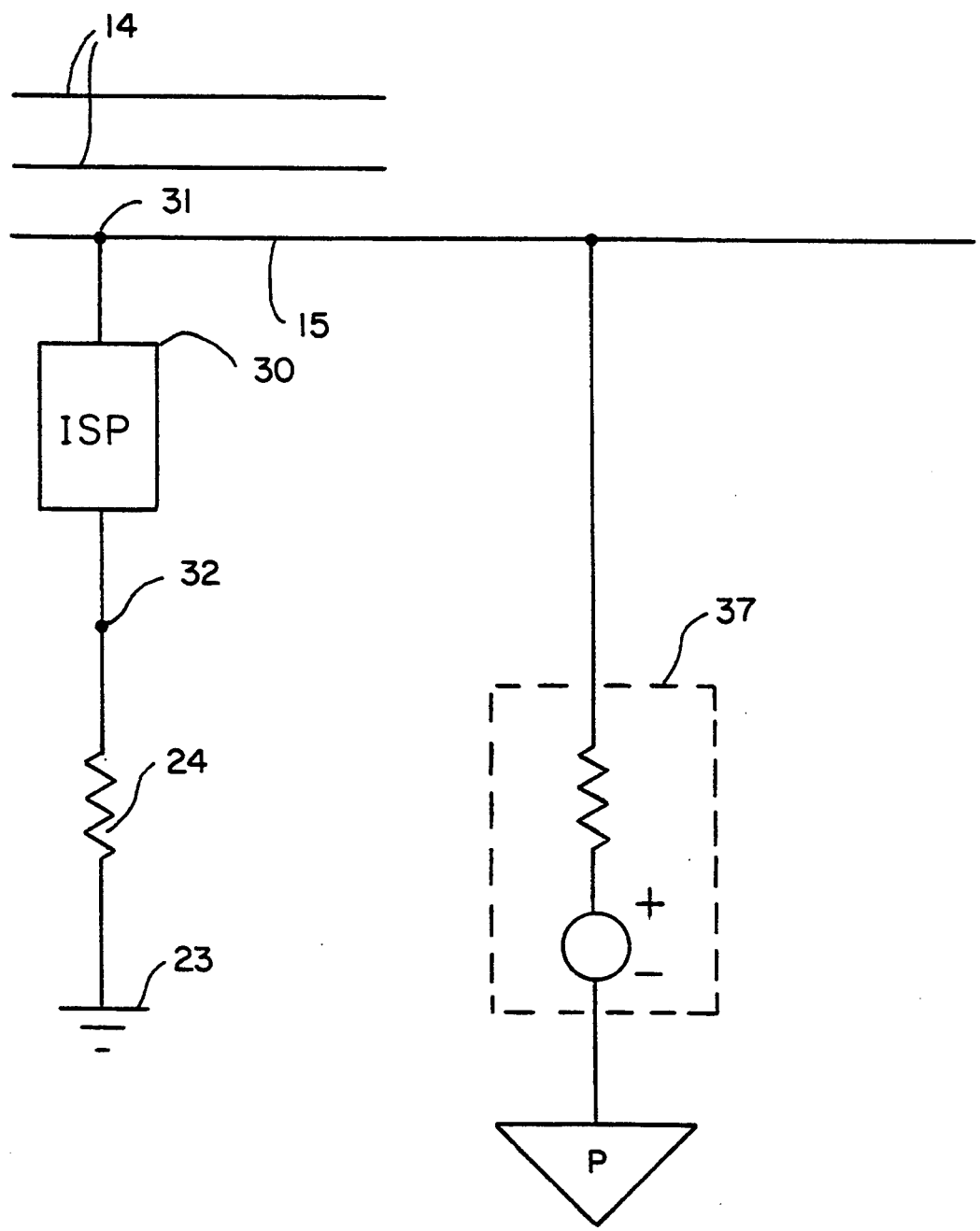
FIG. 1 is a schematic circuit diagram of a power system including an isolator/surge protector.

With reference to the drawings, a schematic view of the interconnection of a power system lines 14 and a DC isolated structure 15 is shown in FIG. 1 for purposes of illustrating the present invention. The isolated structure 15 may be, for example, the pipe used in a metal encased high voltage system, a ground stake or a gas transmission line.

Because of conducting line resistance, imperfect electrical contact with the structure 15, and the character of the ground, a certain finite resistance 24 exists between the structure 15 and the true ground potential which is illustratively represented at a node 23 in FIG. 1. An external DC source 37 may be applied to the structure 15 to minimize the oxidation of the structure 15.

An ISP 30 in accordance with the present invention may be connected between the structure 15 and the ground as illustrated in FIG. 1. Alternatively, the ISP 30 may be coupled to other systems, such as a power transformer, or may be used in the electrical system discussed in U.S. Pat. No. 4,958,250. The ISP 30 normally presents a very high DC impedance between nodes 31 and 32 so that substantially no DC current flows between the nodes. Thus, DC voltages appearing on the structure 15 are not transmitted through the ISP 30 to the ground 23.

In the event, however, of a fault on the structure 15, such that voltages above a selected threshold voltage are applied to the structure 15, the ISP 30 switches to provide a low impedance path between nodes 31 and 32, thereby shunting any fault current back to the ground 23. For example, if the power system lines 14 short circuit to the structure 15, the ISP 30 provides a path to ground 23.

Figure 2:
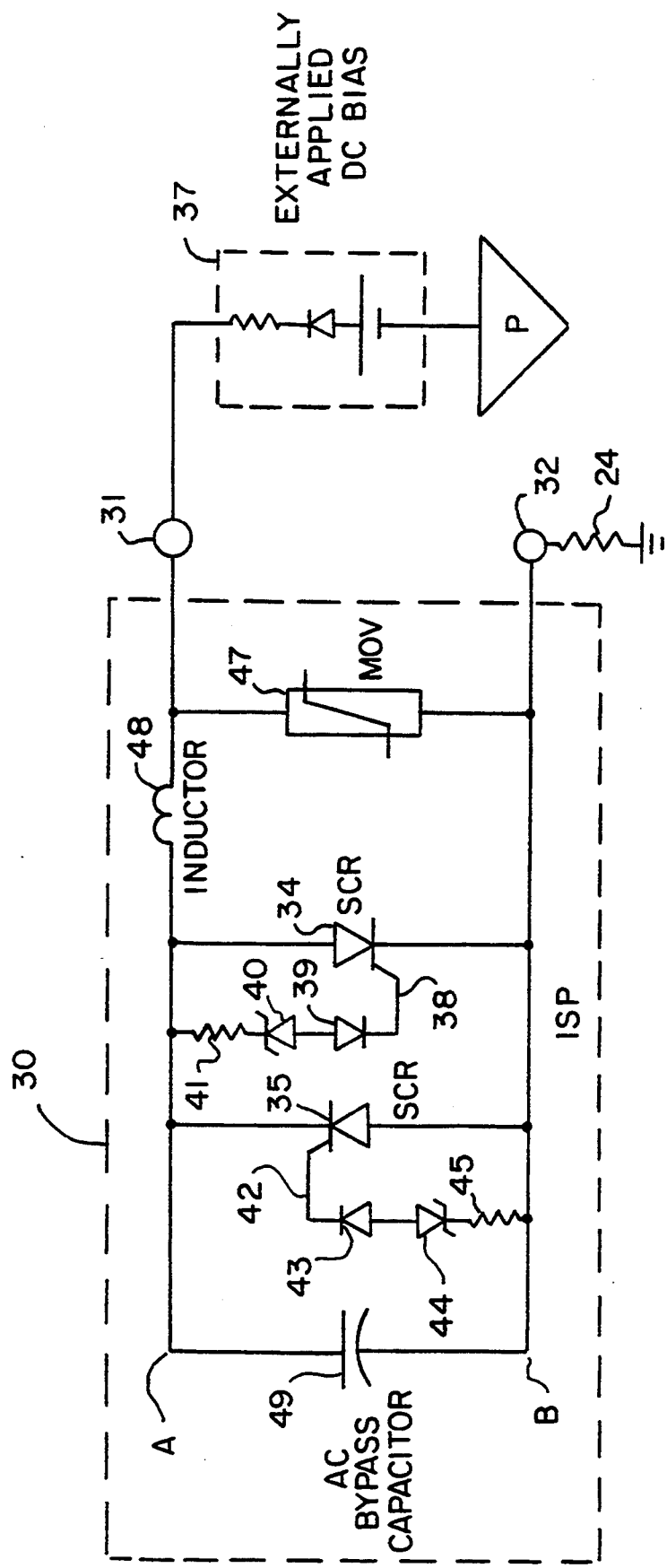
FIG. 2 is a simplified basic circuit diagram of the isolator surge protector of the invention without a bypass circuit for the thyristors, and showing the externally applied DC bias voltage.

An electrical schematic of a basic ISP 30 is shown in FIG. 2, wherein the apparatus is connected between the node 31 and the node 32. The ISP 30 includes a pair of triggerable electronic switches or thyristors such as SCRs 34 and 35 connected in parallel, with opposite polarity of conduction, between nodes A and B, an inductor 48 connected in series with the anti-paralleled SCRs 34 and 35, and a varistor 47 connected in parallel with the series-parallel combination of inductor 48 and SCRs 34 and 35. The entire combination of elements is connected between the nodes 31 and 32. An AC bypass capacitor 49 may be coupled between the nodes A and B and thus across the thyristors 34 and 35.

The value of the bypass capacitor 49 is selected so as to provide a relatively low impedance AC path to ground at all times so that any steady-state AC current can be diverted to ground while still blocking DC. For corrosion protection applications, the capacitor 49 is typically a 10,000 or 20,000 microfarad ($\mu$F) capacitor. For example, with the thyristors 34 and 35 being set to trigger at 9.1 volts, the capacitor 49 allows either 24 or 48 amperes AC RMS 60 HZ (depending upon whether its capacitance is 10,000 or 20,000 $\mu$F) to flow from node 31 to 32 while still blocking DC before the 9.1 volt trigger levels are reached. If the current exceeds the 24 or 48 ampere level, it is assumed that a fault or other system disturbance has occurred, and the capacitor 49 is bypassed by turning on the inverse parallel thyristors 34 and 35 to protect the capacitor 49 against excessive currents and keep the voltage across nodes 31 and 32 to a safe level.

A gate 38 of the SCR 34 is coupled to the anode of the SCR 34 through a rectifier diode 39, a zener diode 40, and a resistor 41. The rectifier diode 39 is connected to have the same polarity as the SCR 34, blocking any reverse current that might flow from the secondary terminal 32 through the SCR cathode, thereby preventing any damage to the SCR 34. The zener diode 40 is connected with polarity appropriate to block current flowing from the primary terminal 31 to the gate 38 of the thyristor below the breakover voltage of the zener diode 40 while passing current above the breakover voltage. The resistor 41 limits the current flowing into the gate under expected transient voltage conditions until the thyristor is triggered to conduct. The gate 42 of the thyristor 35 is similarly connected to the anode of the thyristor 35 through a rectifier diode 43, a zener diode 44 and a resistor 45. It has been found that a satisfactory typical breakover voltage for zener diodes 39 and 44 is approximately 10 volts peak (approximately 7 volts RMS). Typically, the inductor 48 has a value of approximately 1 to 4 microhenries and the varistor 47 is a metal oxide type with turn-on voltages of about 400 volts. The operation of the basic surge protector 30 is discussed in, for example, U.S. Pat. No. 4,958,250.

The external bias voltage source 37 provides a voltage between nodes 31 and 32. A typical voltage value that is compatible with the above-named component values may be from less than one volt to several volts for corrosion protection applications. Other applications require DC voltage from 100 to several thousand volts, and this may require modification to the circuitry shown in FIG. 2. Because of this voltage source, a continuous DC current may flow through one of the thyristors after the surge condition is over. The present invention provides turn off of the thyristor when the DC current is below a level indicative of a surge and is due to the bias voltage source.

With reference to FIG. 3, a simplified block diagram of a first preferred exemplary embodiment of a portion of the ISP 30 is shown which includes a bypass circuit 50 coupled to the thyristors (SCRs) 34 and 35. The trigger circuitry for the SCRs 34 and 35 associated with the ISP 30 has been eliminated from FIG. 3 for simplicity. The bypass circuit 50 is an autonomous unipolar turnoff circuit for providing a low impedance path across nodes A and B (SCRs 34 and 35) to selectively pass current from node A to node B. The bypass circuit 50 includes a diode 53, a diode 55, a capacitor 57, a resistor 51, a capacitor 59, a logic and drive circuit 52, a Schottky diode 60, and a MOSFET 62. The anode of the diode 60 is coupled to the anode of the SCR 34, and the cathode of the diode 60 is coupled to the drain of the MOSFET 62. The gate of the MOSFET 62 is coupled to the logic and drive circuit 52. The source of the MOSFET 62 is coupled to the cathode of the thyristor 34. The anode of the diode 55 is also coupled to the anode of Schottky diode 60. The cathode of the diode 55 is coupled to the logic and drive circuit 52 and a first terminal of the capacitor 57. A second terminal of the capacitor 57 is coupled to the cathode of the thyristor 34. The cathode of the thyristor 34 is also coupled to the logic and drive circuit 52. The anode of the diode 53 is coupled to node A, and the cathode is coupled to a node F. The node F is coupled to a first terminal of the capacitor 59 and resistor 51.

The logic and drive circuit 52 includes an undervoltage comparator 54, a filtered SCR voltage comparator 56 and an AND gate 58. A node designated Vcc which is coupled to the cathode of diode 55 is connected to the positive input of the undervoltage comparator 54. The negative input of the comparator 54 typically receives a 7.5 volt reference voltage. The negative input of the filtered SCR voltage comparator 56 is coupled to the node F and the positive input is typically coupled to a 2.0 volt reference. Comparators 54 and 56 may be incorporated in the same integrated circuit (IC) unit and be powered by the voltage Vcc across the capacitor 57. The outputs of the comparators 54 and 56 are provided to the inputs of the AND gate 58. The output of the AND gate 58 is provided to the gate of the MOSFET 62.

The operation of bypass circuit 50 may be described as follows with reference to FIG. 3. Whenever the SCR 34 is triggered due to a triggering event such as a lightning strike or other surge current event, an instantaneous anode to cathode voltage of at least equal to the breakover voltage of the diode 40 in FIG. 2, which is typically at least 12 to 13 volts, is applied across the SCR 34 and the SCR is triggered or fired by the circuitry in the ISP 30 as described above. Every time the SCR 34 triggers, the SCR is in danger of becoming permanently latched ON because of the external bias provided by the voltage source 37 (shown in FIG. 2). Once conducting, the SCR 34 will continue to conduct as long as a current greater than the holding current flows through the SCR, which means that the voltage across the SCR is greater than the holding voltage since the voltage across the SCR is related to the current flowing through it (although not necessarily linearly related). In order to reduce the current through the SCR 34 to a level below the holding current and hence turn OFF the SCR 34, the MOSFET 62 is controlled to provide a low impedance path across the SCR.

The MOSFET 62 is an electronically controlled switch which provides such a low impedance path. The closure of the MOSFET 62 is effected by applying a drive voltage to the gate of the MOSFET 62. Opening the MOSFET 62 is effected by removing the drive voltage from the gate. The combined voltage drop across the Schottky diode 60 and the MOSFET 62 at maximum DC current must be less than the minimum holding voltage of the SCR 34 so that the SCR may be turned OFF. Typically, this minimum holding voltage is as low as approximately 0.6 volts at elevated junction temperatures.

The logic and drive circuit 52 produces the drive voltage in response to voltage conditions across the SCR 34. When the SCR 34 is triggered, the capacitor 57 is charged to a voltage approximately equal to the breakover voltage of the diode 40 plus the gate to cathode trigger voltage of the SCR 34, less the voltage drop of the diode 55. This total is typically approximately 12.0 volts. The capacitor 57 may be a good quality low inductance type of capacitor, such as a metallized polypropylene capacitor, so that it may rapidly charge to the desired level of voltage when a rapidly rising voltage is applied to the ISP 30, which causes the voltage across the SCR 34 to rise from 0 to the trigger voltage in less than one microsecond. The energy thus captured powers the logic and drive circuit 52 for a sufficient amount of time so that the circuit 52 remains energized until conditions are correct for implementing the bypass function. Typically, the capacitor 57 is connected physically close to the SCRs 34 and 35 to minimize stray wiring inductance.

Figure 8:
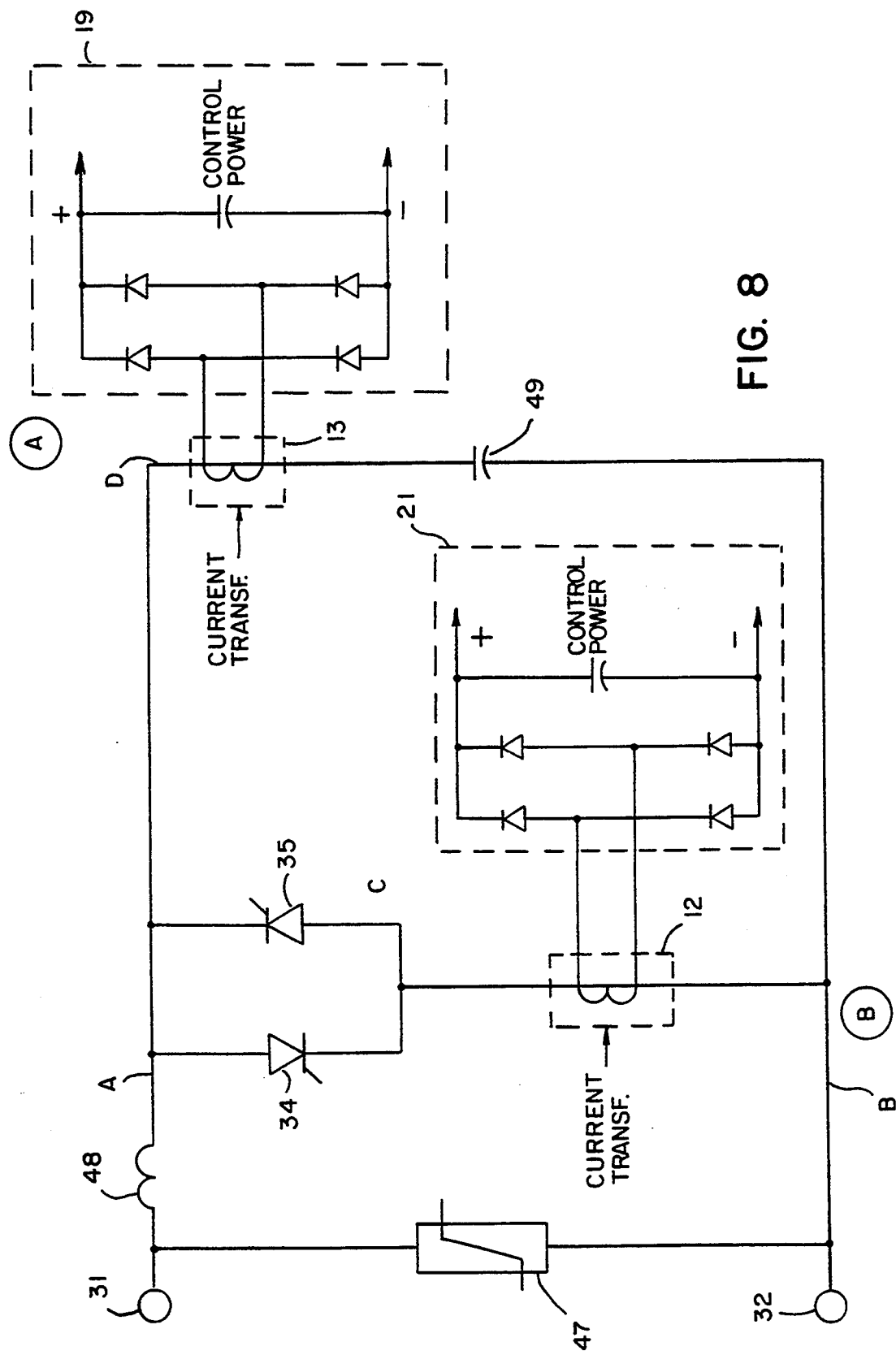
FIG. 8 is a simplified schematic of an ISP utilizing current transformers.

With reference to FIG. 8, the circuit 52 may alternatively be powered by a current transformer 12 and a rectifying bridge and capacitor network 21 coupled to a line leading from a node C to node B. Alternatively, the circuit 52 may be powered by a current transformer 13 and a rectifying bridge and capacitor network 19 coupled to a line leading from node D via the capacitor 49 to node B.

With reference to FIG. 3, the capacitor 57 is sized so that the voltage across it decays from its initial value at the triggering of SCR 34, approximately 12 volts, to about 7.5 volts after a minimum period that typically should be about 100 milliseconds. As long as the voltage at capacitor 57 is greater than 7.5 volts, the output of the undervoltage comparator 54 is a logic HIGH which is provided to one of the inputs of the AND gate 58. Thus, the undervoltage comparator 54 opens an "active window" of typically 100 milliseconds after each triggering event during which the output of the AND gate 58 may turn on the MOSFET 62. The 100 millisecond time period is chosen because the SCR would latch on due to DC follow current from external source 37 (shown in FIG. 2) within a period significantly less than 100 milliseconds after the last triggering event of the SCR 34. SCR 34 only needs to conduct without a break since it was last triggered for a maximum period greater than one cycle at the AC line frequency to signal the onset of unidirectional current flow.

During this active window, the MOSFET 62 can be driven ON if commanded by the filtered SCR voltage comparator 56. The rising voltage at the anode of the SCR 34 before the SCR is triggered is transmitted essentially instantaneously via diode 53 across the capacitor 59 to the negative input terminal of the comparator 56 at a node F. The falling voltage is delayed or "filtered" by the RC time constant of the resistor 51 and capacitor 59, e.g., typically 15 milliseconds, so that the comparator 56 reacts only after a time delay somewhat greater than one cycle of line frequency to a decreasing SCR voltage. The comparator 56 gives a high output whenever the voltage across the capacitor 59 falls below a predetermined level. This level is set to be higher than the maximum SCR voltage drop at any value of DC follow current from the external source 37. A suitable level of approximately 2.0 volts (or highter, if appropriate) ensures that the MOSFET 62 is closed at the level of DC follow current.

Whenever the voltage at the node F falls below 2.0 volts within the active window of 100 milliseconds defined by the comparator 54, both inputs to the AND gate 58 are HIGH and the AND gate 58 applies a gate drive voltage to the MOSFET 62. The MOSFET 62 is driven into conduction and bypasses current away from the SCR 34. At the end of the active window, the output of comparator 54 becomes logic LOW and removes the gate drive voltage from the MOSFET 62 in response to the logic LOW at the AND gate 58. The ISP 30 returns to a high impedance blocking state because the turn OFF voltage of the SCR 34 has been reached while the MOSFET 62 was turned ON. The MOSFET 62 is prevented from closing during a normal blocking operation because the filtered voltage across the capacitor 59 at normal line frequency always remains higher than 2.0 volts when the voltage across the nodes A and B is greater than 7.5 volts. Alternatively, signals representing the current through the SCRs 34 and 35 may be provided by a current transformer 12, or signals representing the current through the capacitor 48 may be provided by a current transformer 19 as is shown in FIG. 8.

Figure 4:
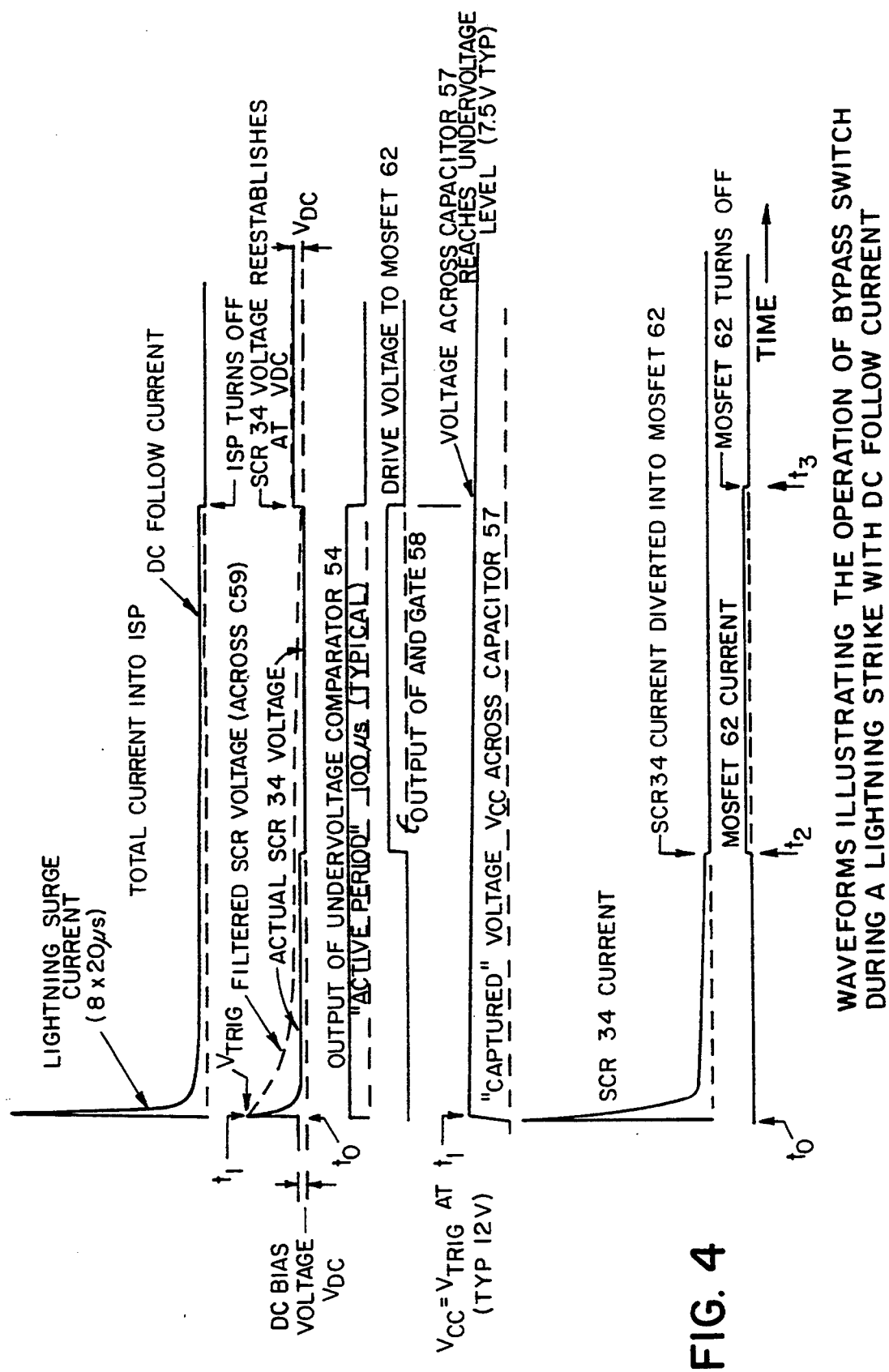
FIG. 4 is a waveform illustrating the operation of the autonomous isolator circuit during a lightning strike with DC follow current.

The operation of the ISP 30 of FIG. 3, when a high current surge such as caused by a lightning strike is applied to the ISP, is illustrated diagrammatically by the waveforms of FIG. 4. Prior to time $t_0$, the ISP 30 has a DC bias voltage $V_{DC}$ applied, and the forward blocking voltage across SCR 34 is $V_{DC}$. At time $t_0$, a surge of current flows into the ISP 30. As a result of this current, the voltage across SCR 34 increases rapidly (typically within a microsecond). At time $t_1$, the voltage across SCR 34 reaches the trigger level, typically about 12 V, and SCR 34 turns on.

The voltage across the capacitor 57 also reaches $V_{TRIG}$ at time $t_1$. The voltage on the capacitor 57 is retained after SCR 34 has fired, due to the blocking action of the diode 55, and this voltage, $V_{CC}$, is available to power the control circuit 52. The output of the undervoltage comparator 54 assumes a logic high value at time $t_1$, since at this time the voltage $V_{CC}$ across the capacitor 57 is higher than the undervoltage trip level, which may typically be set to about 7.5 V.

The voltage across the capacitor 59 also increases to a level of $V_{TRIG}$ at time $t_1$. The voltage across the capacitor 59 is trapped by the diode 53 when the SCR 34 fires at time $t_1$. The voltage across the capacitor 59 then proceeds to discharge through the resistor 51.

At time $t_2$, the current through the SCR 34 has already fallen to just the DC follow current, caused by the steady bias voltage $V_{DC}$ applied to the ISP, and the filtered SCR voltage across the capacitor 59 has decayed to the switching level (typically about 2 V) of the SCR voltage comparator 56. The output of comparator 56 assumes a logic high value, the MOSFET 62 is turned on, and the DC follow current flowing in the SCR 34 is diverted into the MOSFET 62.

At time $t_3$ the voltage across the capacitor 57 has decayed to the switching level of the undervoltage comparator 54, the output of this comparator assumes a logic low value, turning off the MOSFET 62, reducing the DC follow current to zero, and re-establishing the applied DC bias voltage across the SCR 34.

Figure 5:
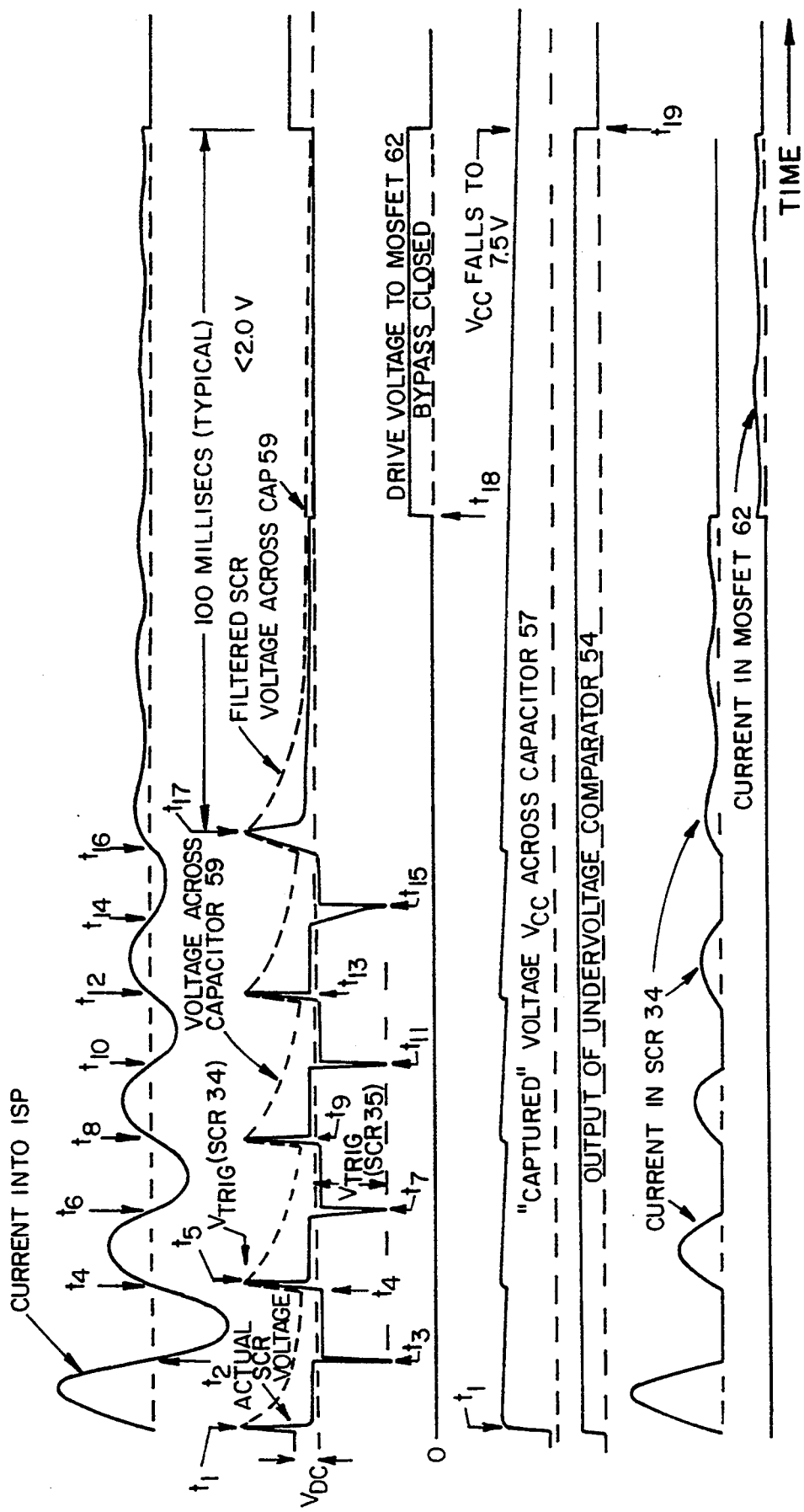
FIG. 5 is another waveform illustrating the operation of the autonomous isolator circuit under AC fault with DC follow current.

The operation of the ISP 30 of FIG. 3 when a line frequency AC fault is applied to the ISP is illustrated diagrammatically by the waveforms of FIG. 5. Prior to time $t_0$, the ISP 30 has a DC bias voltage $V_{DC}$ applied, and the forward blocking voltage across SCR 34 is $V_{DC}$. At time $t_0$, a surge of AC line current flows into the ISP 30. As a result of this current, the voltage across the SCR 34 increases rapidly. At time $t_1$ the voltage across the SCR 34 reaches the trigger level $V_{TRIG}$, typically about 12 V, and the SCR 34 turns on.

The voltage across the capacitor 57 also reaches $V_{TRIG}$ at time $t_1$. The voltage on the capacitor 57 is retained after the SCR 34 has fired, due to the blocking action of the diode 55, and voltage $V_{CC}$ is now available to power the control circuit 52. The output of the undervoltage comparator 54 assumes a logic high value at time $t_1$, because at this time the voltage $V_{CC}$ across capacitor 57 is higher than the undervoltage trip level.

The voltage across capacitor 59 also increases to a level of $V_{TRIG}$ at time $t_1$. The voltage across capacitor 59 is trapped by diode 53 when SCR 34 fires at time $t_1$.

At time $t_2$, the AC fault current reverses, and at time $t_3$ the SCR 35 fires. The SCR 35 carries the fault current until this current again reverses at time $t_4$. At time $t_5$, the SCR 34 fires, and carries the fault current until time $t_6$, when the fault current again reverses. The sequence of alternating conduction of the positive and negative half-cycles of the fault current by the SCRs 34 and 35 respectively, continues until, e.g., time $t_{17}$, at which point the SCR 34 fires and stays in indefinite conduction, because the net current in this SCR does not again reverse polarity.

Throughout the period $t_1$ to $t_{17}$ the voltage $V_{CC}$ across capacitor 57 charges to $V_{TRIG}$ just prior to each refiring of SCR 34. This voltage therefore remains higher than the undervoltage level of comparator 54, and the output of comparator 54 remains at logic high.

Also throughout the period $t_1$ to $t_{17}$, the filtered SCR voltage across capacitor 59 remains higher than the switching voltage of the SCR voltage comparator 56, and the output of this comparator remains at logic low.

At time $t_{18}$ the filtered SCR voltage across the capacitor 59 has decayed to the switching level of comparator 56. The output of the comparator 56 assumes a logic high value, the output of the AND gate 58 assumes a logic high value, the MOSFET 62 is turned on, and the DC follow current in SCR 34 is diverted into MOSFET 62.

At time $t_{19}$, the voltage across capacitor 57 has decayed to the switching level of the undervoltage comparator 54, the output of this comparator assumes a logic low value, turning off the MOSFET 62, reducing the DC follow current to zero and re-establishing the applied DC bias voltage across the SCR 34.

During normal blocking operation, at voltage below the SCR trigger level, the MOSFET 62 does not receive gate drive and the bypass switch remains permanently open. This is because drive voltage for the MOSFET 62 is produced only when $V_{CC}$ is simultaneously greater than the undervoltage trip level (typically about 7.5 V) and the filtered SCR voltage is less than about 2.0 V. This condition does not occur during normal blocking operation, because the time constant of the capacitor 59 and the resistor 51 is set to about 15 milliseconds and the filtered SCR voltage across the capacitor 59 at normal line frequency always remains higher than 2.0 V, when $V_{CC}$ is greater than 7.5 V - - - even when pure AC voltage is applied to the ISP 30.

Figure 6:
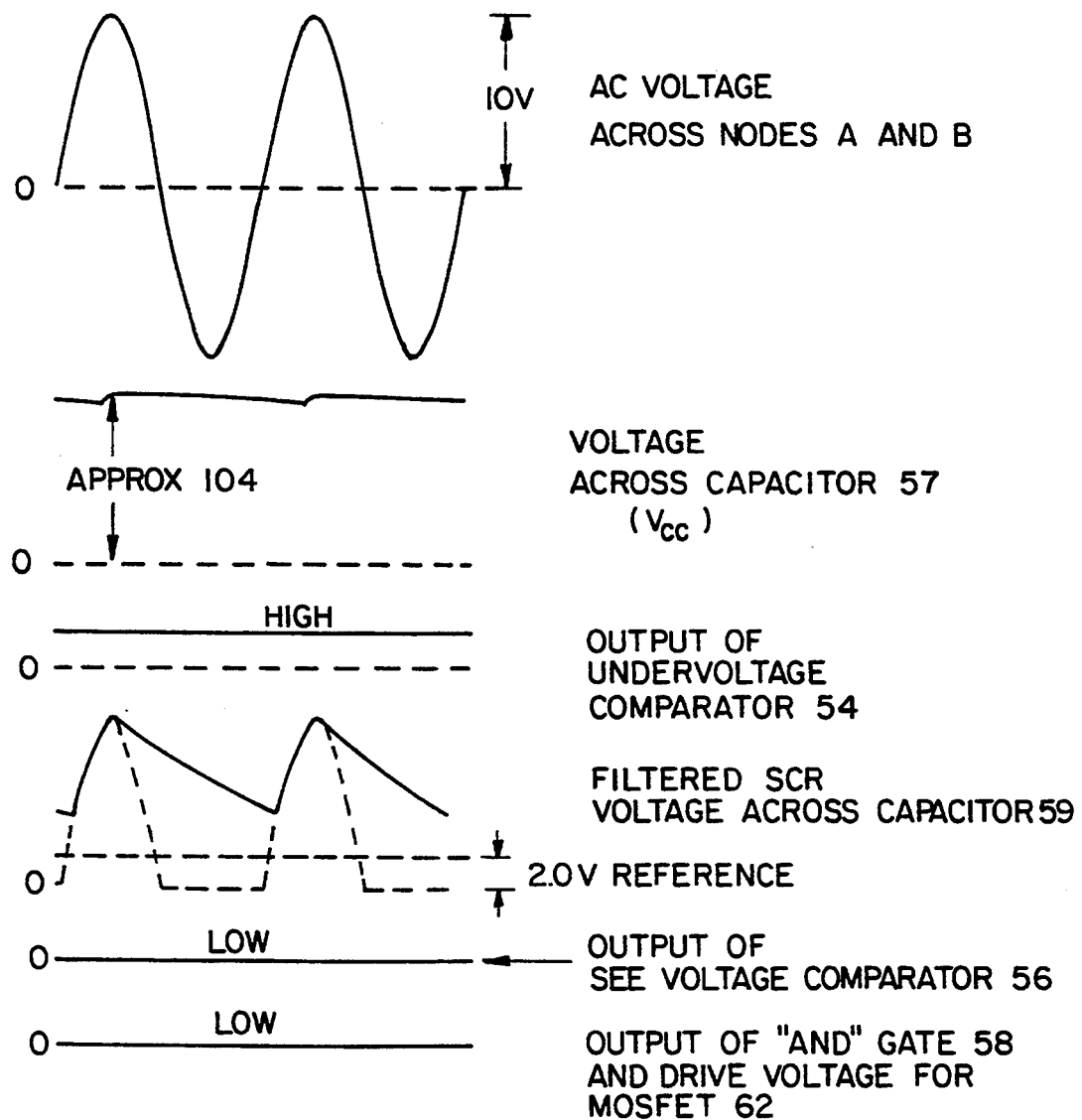
FIG. 6 is another waveform illustrating operation of the control circuit with an AC voltage of 10 volts peak across nodes A and B.
Figure 7:
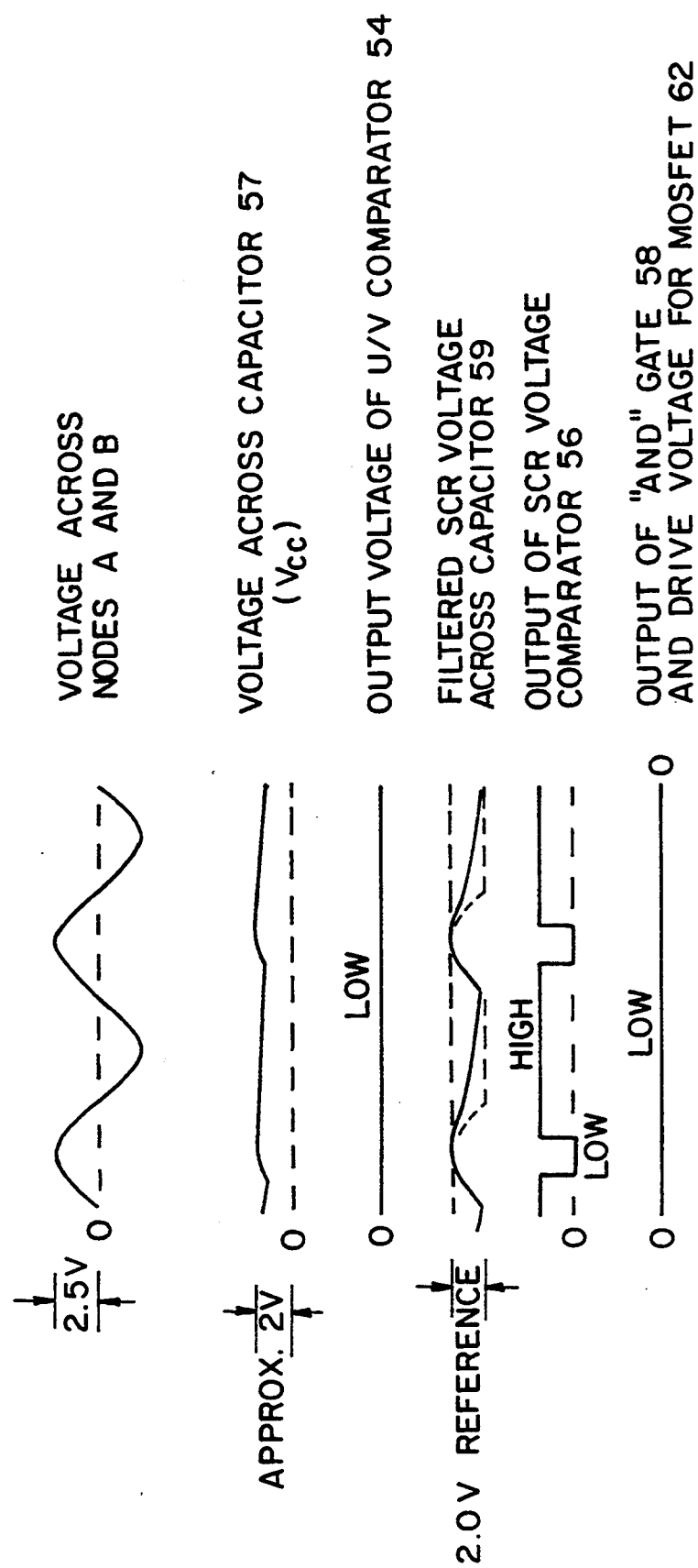
FIG. 7 is yet another waveform illustrating the operation of the control circuit with an AC voltage of 2.5 volts peak across nodes A and B.

Operation of the ISP 30 at AC voltage that is less than the SCR triggering level is illustrated diagrammatically by the waveforms in FIGS. 6 and 7. The waveforms in FIG. 6 illustrate the operation with a steady AC voltage across the SCRs 34 and 35, having a 10V peak amplitude. The output of the undervoltage comparator 54 is permanently high, but the output of the SCR voltage comparator 56 is permanently low. The drive voltage to the MOSFET 62 is therefore permanently low and the bypass switch is permanently off.

The idealized waveforms in FIG. 7 illustrate the operation with a steady AC voltage across the SCRs, having a 2.5 V peak amplitude. The output of the SCR voltage comparator 56 goes "high" for periods, but the output of the undervoltage comparator 54 is permanently low. The gate drive voltage to the MOSFET 62 is therefore permanently low and the bypass switch is off.

In the above description, typical values of operating levels are referenced. It is understood that other widely different operating values could be chosen to suit any particular design requirement without altering the operating principles.

Figure 9:
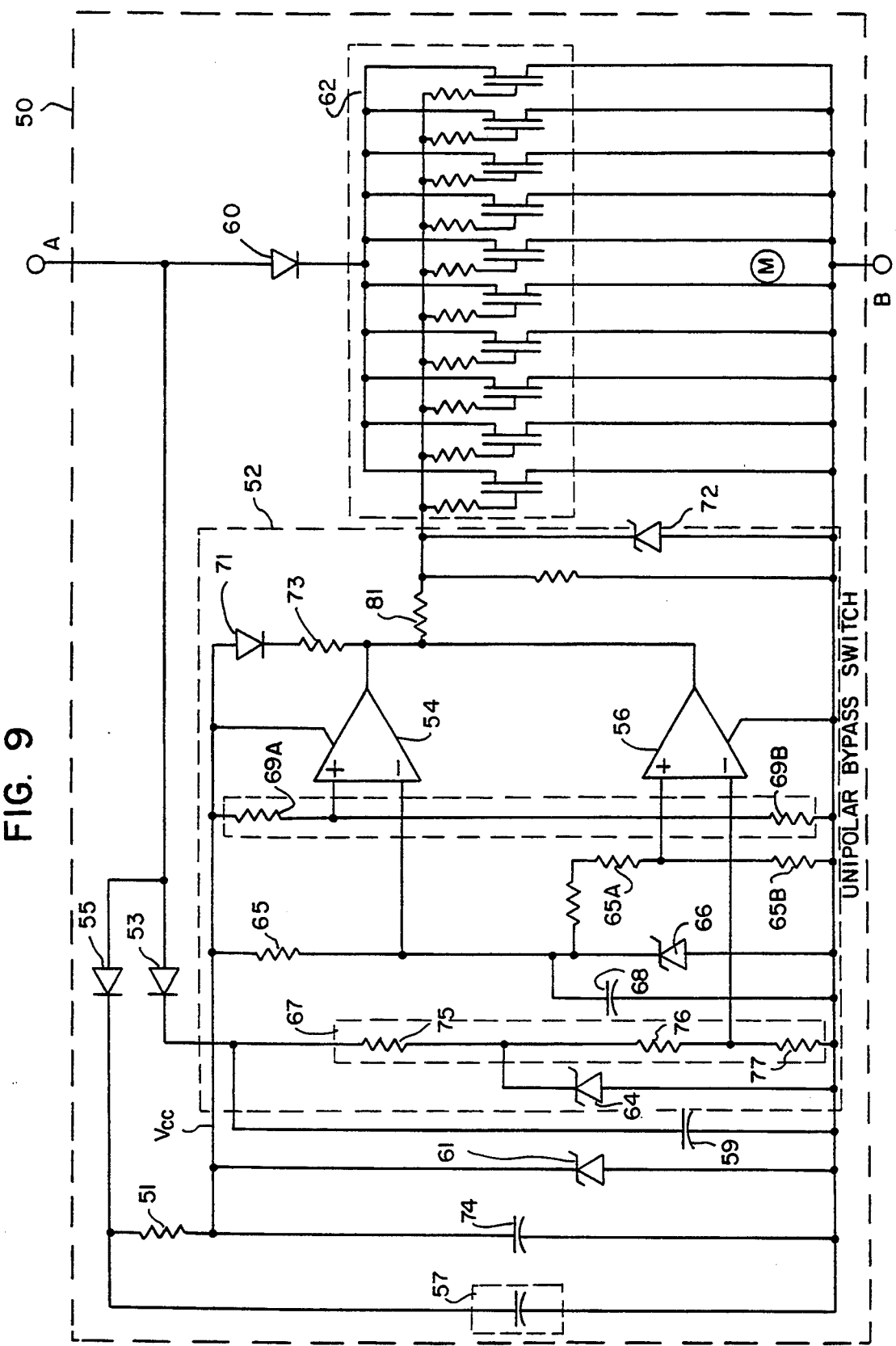
FIG. 9 is a more detailed schematic circuit diagram of an autonomous isolator surge protector in accordance with the invention.

A more detailed diagram implementing an autonomous unipolar bypass circuit 50 is shown with reference to FIG. 9. MOSFET 62 is comprised of ten IRFZ 44 MOSFET transistors connected in parallel. Individual resistors of 100 ohms are connected in series with each MOSFET gate to prevent the possibility of parasitic oscillation of the parallel connected MOSFETs. The capacitor 57 may be comprised of four 5 μF 100 V polypropylene capacitors. The resistor 51 and the zener diode 61 are employed to control the voltage of a capacitor 74 to about 15 volts.

Resistors 75, 76 and 77 are connected in series. Resistor 75 in combination with a zener diode 64 clips the peak SCR voltage presented at the resistors 76 and 77 to about 10 volts. Resistors 76 and 77 attenuate this "clipped" SCR voltage at the negative input of the comparator 56 so that when the actual SCR voltage across nodes A and B is about 2.0 V, the attenuated SCR voltage at the negative input terminal of the comparator 56 is about 400 mV. The capacitor 59 is typically a 1.0 μF 100 V polypropylene capacitor.

The comparators 54 and 56 are comprised of two portions of an LP339 quad-comparator coupled to various biasing resistors. The comparators 54 and 56 are powered by the Vcc node voltage and are also connected to a "ground" return, in this case, node B.

With reference to FIG. 9, the operation of the bypass circuit 50 is essentially similar to the operation described with reference to FIG. 3. When a triggering event occurs, the voltage across nodes A and B becomes greater than approximately 12.0 volts. The capacitor 57 stores energy and provides a voltage at the node Vcc. A zener diode 66 is powered from the node Vcc via a resistor 65 and provides a nominal 5.1 V reference voltage. This reference voltage is attenuated by resistors 65A and 65B to about 400 mV at the positive input terminal of the comparator 56, The voltage at the negative input terminal of the comparator 56 becomes 400 millivolts when the actual SCR voltage at the anode of the diode 53 is approximately 2 volts. Thus, the output of the comparator 56 becomes high when the SCR Voltage becomes less than approximately 2 volts.

The 5.1 V reference voltage applied to the negative terminal of the comparator 54 is obtained from the zener diode 66. The capacitor 68 provides filtering and storage functions for the zener diode 66 so that a smooth signal is provided to the comparator 54.

The voltage signal at the node Vcc is provided a voltage divider comprised of resistors 69A and 69B to the positive terminal of the comparator 54. When the voltage at Vcc falls below approximately 7.5 volts, the voltage at the positive terminal of comparator 54 is less than the voltage at the negative terminal, of approximately 5.1 volts, and the output of the comparator becomes a logic low. In contrast, whenever the voltage at Vcc is greater than 7.5 volts, the output of the comparator 54 is a logic high.

After the trigger event, the comparator 56 receives a filtered signal at the negative terminal. The signal is a delayed signal of the voltage at node A after the trigger event. The signal is delayed by an RC time constant determined by the resistor network comprised of resistors 75, 76 and 77 and the capacitor 59. When the signal at the negative terminal of comparator 56 is less than the reference voltage of approximately 400 mV provided at the positive terminal, comparator 56 outputs a logic high. When the comparators 54 and 56 both output a logic high, MOSFET 62 is turned ON by a gate signal passed through a resistor 81.

When the MOSFET 62 is turned ON, the SCR 34 is effectively bypassed. A zener diode 72 provides protection against the voltage at the gate of MOSFET 62 from rising above 15 volts. Since the comparators 54 and 56 have open collector outputs, both must be logic high for a logic high to be produced at the gate of MOSFET 62. If either of the comparators 54 and 56 are logic low, the voltage at the gate is a logic low which turns OFF the MOSFET 62. Thus, the function of AND gate 58 in FIG. 3 may be accomplished by the use of open collector comparators such as the LP339 comparator.

A diode 71 is employed to introduce a voltage drop of approximately 0.4 volts from the node Vcc to the output of the comparators 54 and 56. Thus, the outputs of comparators 54 and 56 are 0.4 volts lower than they otherwise would be for a logic high condition. Therefore, the diode 71 provides additional margin to ensure that the MOSFET gate voltage remains below the 2.0 V threshold level under normal blocking operation of the circuit 50, when the voltage across nodes A to B is less than about 2 V. Under this condition, the LP339 comparator can give an unwanted high output.

Bypass circuit 50 is an autonomous unipolar bypass switch which bypasses in one direction only. This type of bypass circuit 50 is suitable for systems in which the externally applied DC bias voltage from the source 37 always has the same polarity and where the possibility does not exist for the ISP 30 to be mistakenly connected backward in the power system. A second similar unipolar bypass circuit could, of course, be added in inverse parallel for bipolar operation to bypass in the other direction.

Figure 10:
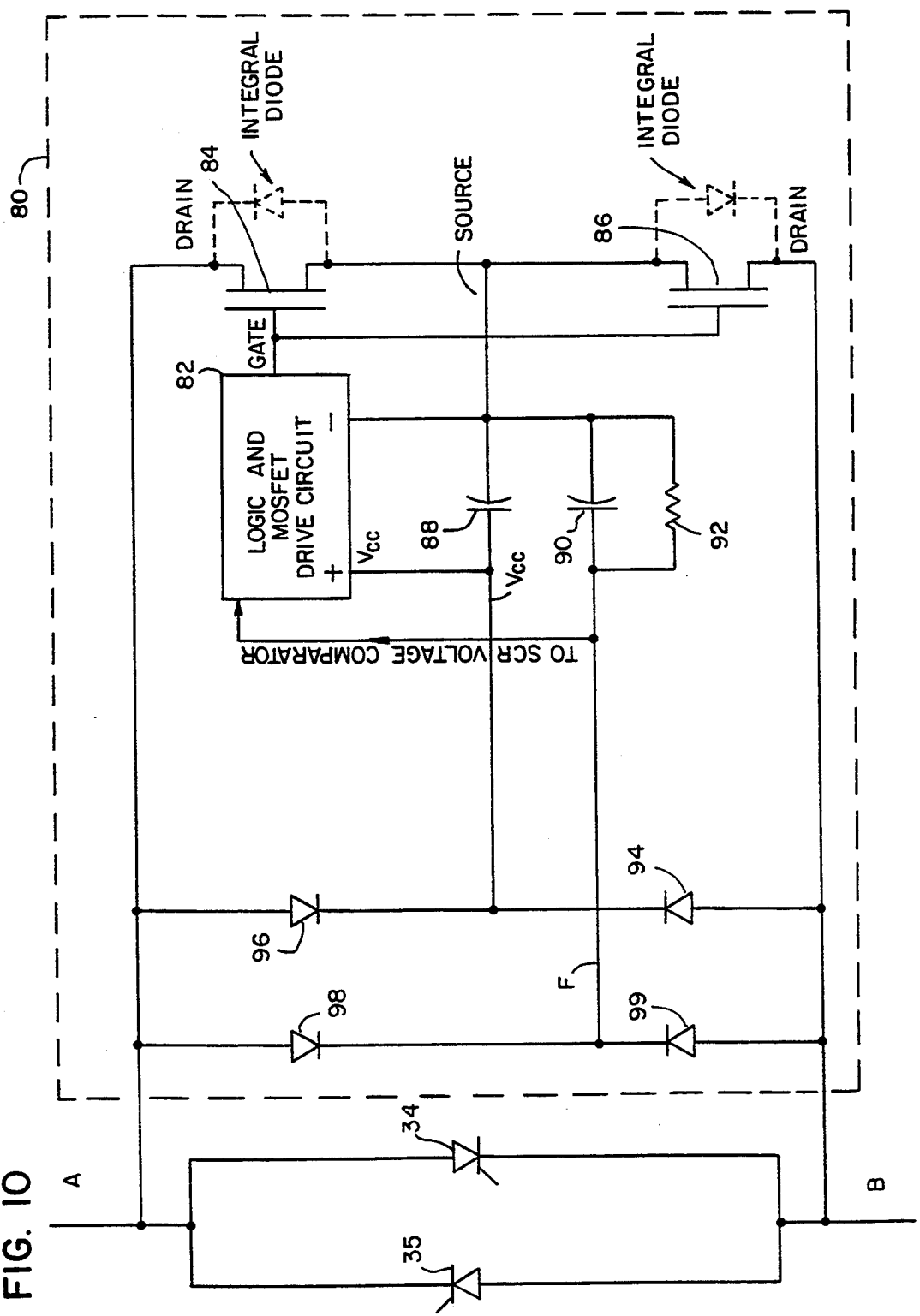
FIG. 10 is a basic circuit schematic of an autonomous isolator surge protector utilizing a bipolar bypass switch.

With reference to FIG. 10, an exemplary autonomous bipolar bypass circuit 80 in accordance with the invention is coupled between the nodes A and B for use in a power system similar to the power system shown in FIG. 1. The bypass circuit 80 includes a MOSFET 84, a MOSFET 86, a logic and drive circuit 82, a capacitor 88, a capacitor 90, a resistor 92, a diode 94, a diode 96, a diode 98, and a diode 99. The MOSFETs 84 and 86 are connected in series opposition across nodes A and B and each include internal anti-parallel diodes integral within their structure.

The node A is coupled to the anodes of the diode 8, the diode. 96 and the drain of the MOSFET 84. The cathodes of the diodes 98 and 96 are coupled to the cathodes of diodes 99 and 94, respectively. The node B is coupled to the anodes of the diodes 99 and 94 and the drain of MOSFET 86. The sources of the MOSFETs 84 and 86 are coupled to each other and to a first terminal of capacitor 88, a first terminal of the capacitor 90, and a first end of resistor 92. A second end of resistor 92 is coupled to a second end of the capacitor 90, the logic and drive circuit 82, and the cathode of the diode 99 (node F). The second end of capacitor 88 is coupled to the node Vcc and the logic and drive circuit 82. The sources of the MOSFETs 84 and 86 are also coupled to logic and drive circuit 82. The gates of the MOSFETs 84 and 86 are coupled to the logic and drive circuit 82.

The operation of bypass circuit 80 is similar to bypass circuit 50. The capacitor 88 captures a positive voltage across the SCR 34 via the diode 96 and the integral diode of the MOSFET 86. The capacitor 88 also captures the negative voltage across the SCR 34 via the diode 94 and the integral diode of MOSFET 84. The voltage associated with capacitor 88 is provided at the node Vcc to the logic and drive circuit 82.

The filtered voltage at the node F also is provided to the logic and drive circuit 82. The positive filtered voltage is provided from node A via the diode 98. The negative filtered voltage is provided from node B via the diode 99. Therefore, the voltage appearing across the capacitor 90 is full wave rectified by diodes 98, 99 and the integral diodes associated with the MOSFETs 84 and 86. The capacitor 90 and the resistor 92 provide an RC time constant similar to the resistor 51 and the capacitor 59 discussed with reference to FIG. 3. This time constant is typically approximately 15 milliseconds which keeps the filtered voltage high for a long enough period of time so that the logic and drive circuit 82 does not turn MOSFETs 84 and 86 ON during a fully asymmetric first half cycle of fault current. Thus, the RC time constant for the capacitor 90 and the resistor 92 is comparable with the period of the line frequency.

When the voltage at the node Vcc is greater than 7.5 volts and the voltage at the node F is below 2.0 volts, the logic and drive circuit 82 provides a positive gate voltage in excess of the threshold voltage at the gates of MOSFETs 84 and 86. When MOSFETs 84 and 86 are turned ON, current flow in either direction is allowed across nodes A and B through the MOSFETs 84 and 86. When the MOSFETs 84 and 86 are turned OFF, current flow is prevented through the MOSFETs 84 and 86. The ON resistance of the MOSFETs 84 and 86 should be selected so that the voltage drop across nodes A and B at maximum DC follow current does not exceed approximately 0.5 volts. The maximum voltage drop across each MOSFET 84 and 86 in the ON state is approximately 0.25 volts. Thus, when the MOSFETs 84 and 86 have positive voltage in excess of the gate threshold voltage applied between the gate and source, they become essentially symmetrical resistive elements for current of either polarity, shunted for current in one direction by the integral diodes.

Figure 11:
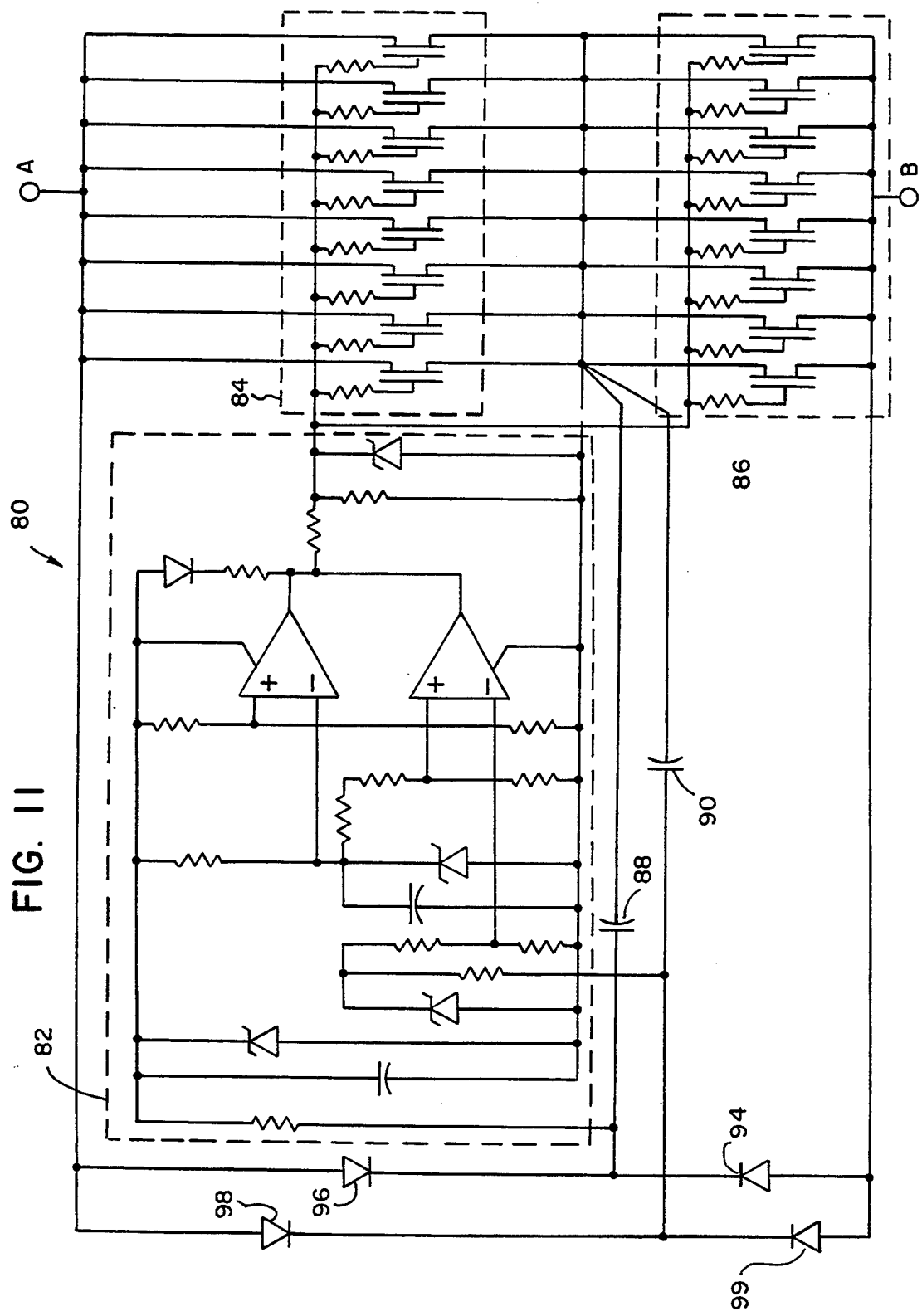
FIG. 11 is a detailed circuit schematic of the isolator surge protector with a bipolar bypass switch.

With reference to FIG. 11, a more detailed schematic of the autonomous bipolar bypass circuit 80 includes similar components to those discussed with reference to FIG. 10. However, MOSFETs 84 and 86 are each comprised of eight MOSFETs such as IRFZ 44 MOSFETs connected in parallel. The operation of the logic and drive circuit 82 is similar to that discussed with reference to the logic and drive circuit 52 with reference to FIG. 9. The capacitor 88 is comprised of four 5.0 $\mu$F polypropylene capacitors.

Figure 12:
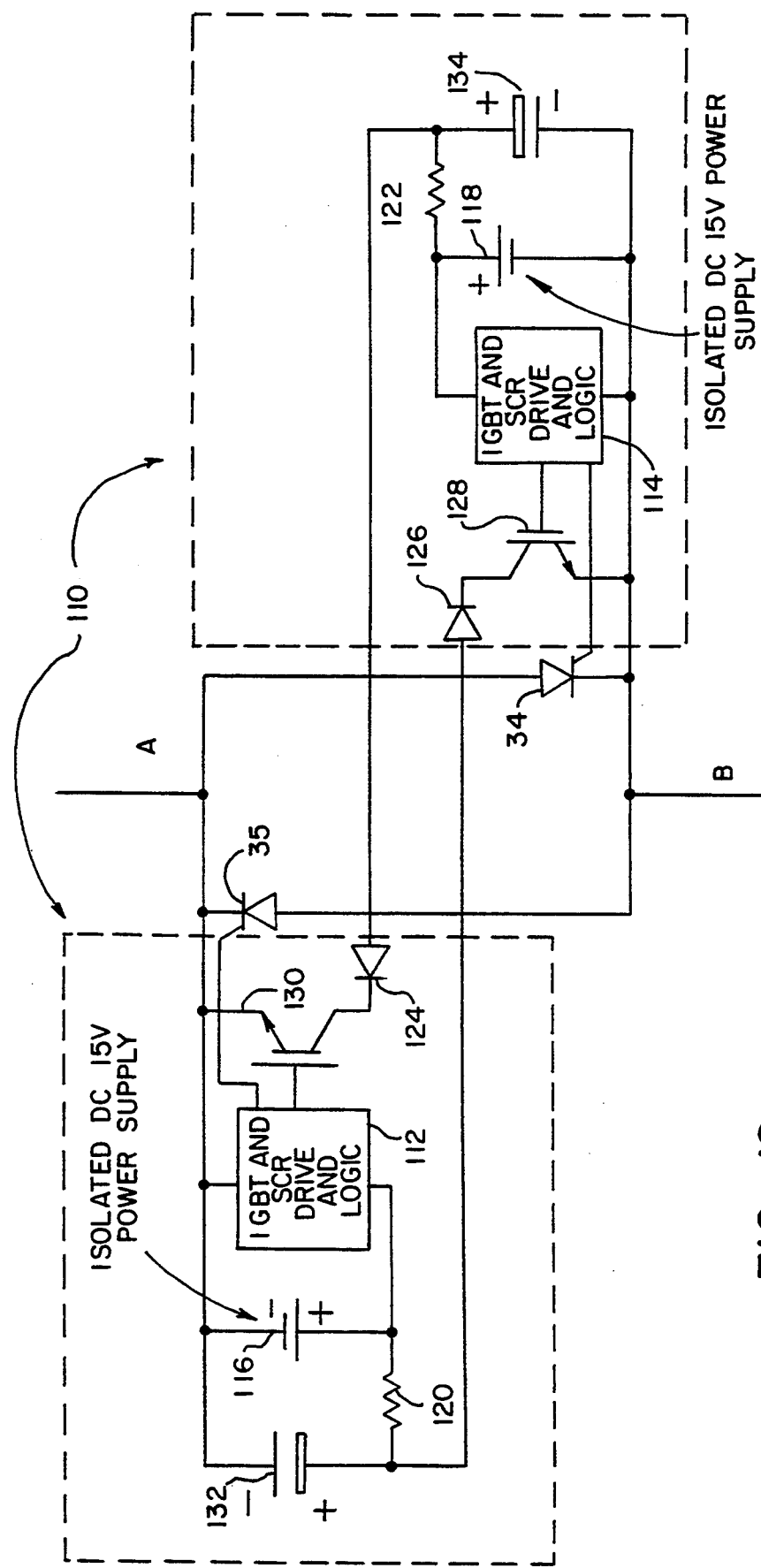
FIG. 12 is a simplified basic schematic for a non-autonomous high voltage isolator surge protector with bipolar bypass.

With reference to FIG. 12, a non-autonomous bypass circuit 110 is shown coupled between the nodes A and B. The bypass circuit 110 has applications which require that high voltage switches with capabilities greater than MOSFETs 84 and 86 be used. However, these high voltage type switches, such as insulated gate bipolar transistors (IGBT), cannot by themselves provide a sufficiently low voltage drop to turn off an SCR and therefore require an additional voltage biasing source to divert the current from the SCR. The additional voltage bias source can conveniently be provided by independent power supplies. Thus, in applications where independent power supplies are available, the circuit 110 provides a turn off circuit with high voltage control capability. The bypass circuit 110 further provides logic for driving the SCRs 34 and 35. Bypass circuit 110 includes a drive and logic circuit 112, a drive and logic circuit 114, a power supply 116, a power supply 118, a resistor 120, a resistor 122, a diode 124, a diode 126, an IGBT 128, an IGBT 130, a capacitor 132, and a capacitor 134.

The node A is coupled to the emitter of the IGBT 130, a terminal of the drive and logic circuit 112, the power supply 116, and the capacitor 132. The node B is coupled to the emitter of the IGBT 128, a second terminal of the drive and logic circuit 114, the power supply 118, and the capacitor 134. The collector of the IGBT 130 is coupled to the cathode of the diode 124, and the anode of diode 124 is coupled to a first end of the resistor 122 and the positive terminal of the capacitor 134. The second end of the resistor 122 is coupled to the positive terminal of power supply 118 and a first input of the drive and logic circuit 114. A first output of the drive and logic circuit 114 is coupled to the gate of the IGBT 128. A second output is coupled to the gate of the SCR 34. The collector of the IGBT 128 is coupled to the cathode of diode 126. The anode of diode 126 is coupled to the positive terminal of capacitor 132 and a first end of resistor 120. A second end of resistor 120 is coupled to the positive terminal of power supply 116 and a first input of the drive and logic circuit 112. The gate of IGBT 130 is coupled to a first output of the drive and logic circuit 112. The gate of SCR 35 is coupled to a second output of the drive and logic circuit 112. The bypass circuit 110 is typically for use with an ISP 30 having a maximum DC blocking voltage of 200 volts, a maximum DC follow current of 150 amps, an AC bypass capacitor of 6,500 microfarad ($\mu$F), an SCR triggering voltage of 300 volts, and a primary auxiliary power source of 110 volts DC. The power supplies 116 and 118 are typically 15 volt power supplies.

The logic and drive circuits 112 and 114 are similar to the logic and drive circuit 82. However, the logic and drive circuits 112 and 114 are responsible for driving the SCRs 34 and 35 and the IGBTs 128 and 130. The logic and drive circuit 114 operates the same with respect to the SCR 34 as the logic and drive circuit 112 operates with respect to the SCR 35. Specifically, taking the above typical example for illustration, when the forward voltage across SCR 34 is greater than 300 volts, the logic and drive circuit 114 provides a drive pulse to the SCR 34. The duration of this drive pulse is sufficient to ensure that the SCR 34 triggers into conduction, and typically could be 30 $\mu$s. The SCR 34 turns ON in response to this drive pulse. Within a set period, which typically may be 80 milliseconds, following the triggering event, the circuit 114 drives the SCR 34 in response to a forward voltage of greater than 5 V across nodes A and B.

When the circuit 110 is required to unlatch or turn OFF the SCR 34, the IGBT 128 is turned ON for a period at least equal to the SCR turn-off time and typically 0.5 milliseconds and then turned OFF. During the period in which the IGBT 128 is turned ON, the DC follow current is diverted from the SCR 34 through the capacitor 132, the diode 126 and the IGBT 128. This diversion results in a reverse voltage of approximately 11 volts across the SCR 34 (15 volts minus the voltage drop across the diode 126 and IGBT 128 which is typically about 4 volts). The power supply 116 provides the proper reverse biasing voltage for the capacitor 132.

When the SCR 34 is reverse biased for a period at least equal to the SCR turnoff time, the SCR 34 is effectively turned OFF. When the drive voltage to the IGBT 128 is removed, the SCR 34 has regained its forward blocking capability and the flow of DC follow current is prevented. The operation for unlatching the SCR 35 is similar to that for the SCR 34 with IGBT 130 operated to unlatch or turn OFF the SCR 35.

Figure 13:
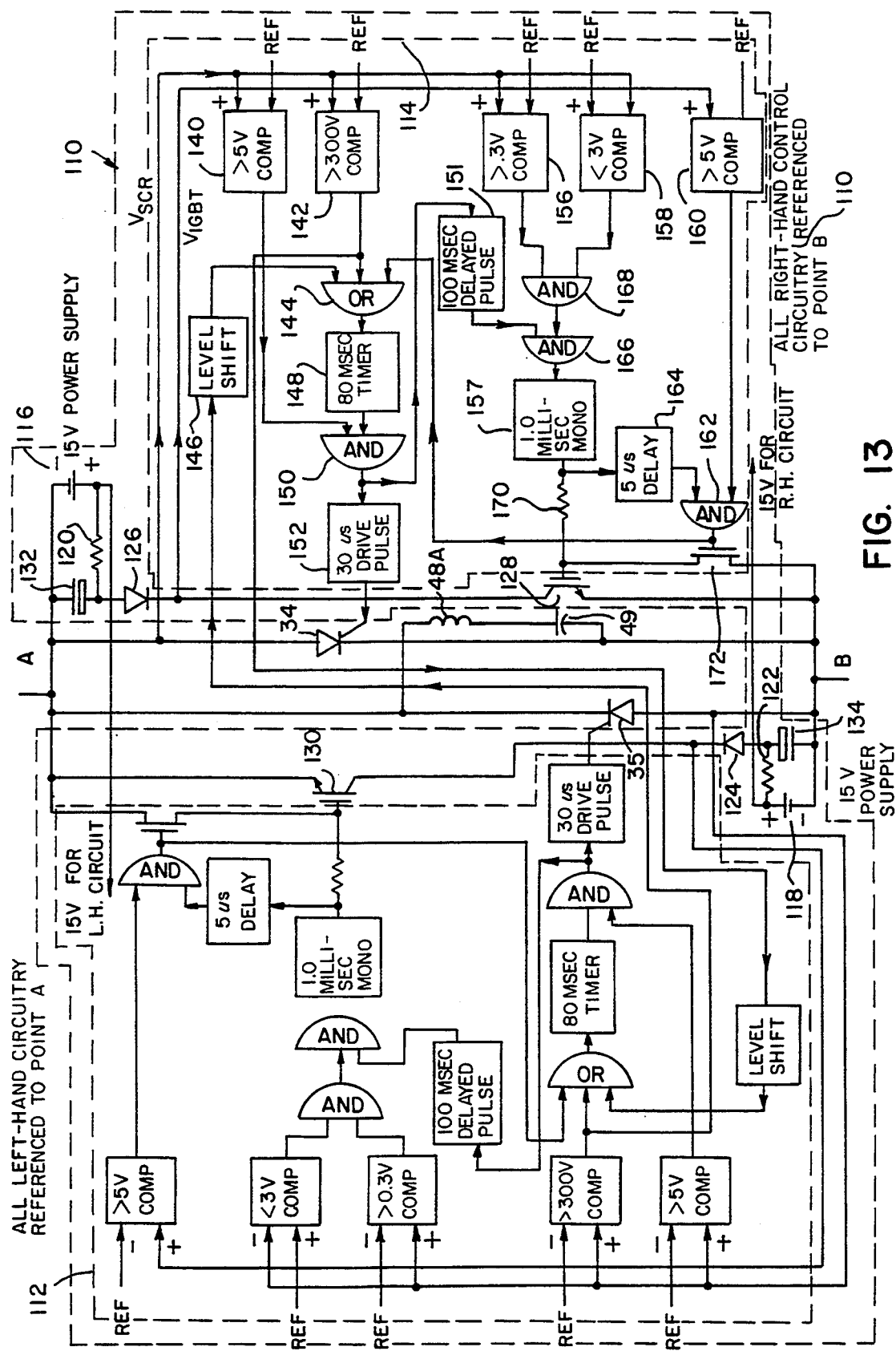
FIG. 13 is a detailed circuit schematic for a non-autonomous high voltage isolator surge protector with bipolar bypass.

A more detailed schematic of the bypass circuit 110 is given in FIG. 13. The bypass circuit 110 includes the IGBT 130, the diode 124, the power supply 118, the resistor 122, the capacitor 134, the logic and drive circuit 112, the IGBT 128, the diode 126, the power supply 116, the resistor 120, the capacitor 132 and the logic and drive circuit 114. The logic and drive circuit 114 is similar to the logic and drive circuit 112.

Logic and drive circuit 114 which controls the SCR 34 and the IGBT 128 includes a 5 volt comparator 140, a 300 volt comparator 142, an OR gate 144, a level shifter 146, an AND gate 150, and a drive pulse generator 152. Logic and drive circuit 114 also includes a pulse generator 151, a 0.3 volt comparator 156, a 3 volt comparator 158, a 5 volt comparator 160, an AND gate 162, a 5 microsecond delay circuit 164, an AND gate 168, a resistor 170, and an FET 172. The node A is coupled to the positive input of the 5 volt comparator 140, the 300 volt comparator 142, and the 0.3 volt comparator 156. The positive terminal of the 5 volt comparator 160 is coupled to the collector of the IGBT 128. Node A is also coupled to the negative terminal of the 3 volt comparator 158.

For the SCR 34 to be fired for the first time, the SCR 34 must have a forward voltage across the nodes A and B of 300 volts or greater. SCR 34 may be fired within 80 milliseconds of the first time firing whenever the voltage from nodes A and B is greater than 5 volts.

An inductor 48A is connected in series with the capacitor 49 across nodes A and B. The SCR firing control circuit is arranged so that whenever the SCR is initially fired from the specified "high voltage" trigger level, such as 300 V, the back-to-back SCRs 34 and 35 are kept essentially in continuous conduction, until all the energy initially stored in the AC bypass capacitor 49 of the ISP has substantially been dissipated, which may take a multiple number of oscillatory cycles for completion.

The total discharge period is determined by the natural oscillation frequency of the capacitor 49 with the inductor 48A. This period typically could be 20 to 30 cycles of oscillation, which typically might take a total time of about 80 milliseconds. The period could be significantly longer or shorter, depending on the particular design.

The inductor 48A in series with the AC bypass capacitor 49 is necessary because the energy stored in the bypass capacitor 49 at the SCR triggering instant is relatively high, in a high voltage ISP. Without this inductor, the capacitor would "dump" all its energy into the SCR 34 or 35, within a short time (a few tens of microseconds) after the SCR is triggered. This is acceptable at low voltage, where neither the energy stored in the capacitor, nor the instantaneous SCR voltage, are too great. At high voltage, however, a rapid dump of a large amount of energy from the capacitor 49 would damage or destroy the SCR. The inductor 48A prevents an immediate "energy dump" from the capacitor 49. It greatly alleviates the stress on the SCR 34 or 35 by letting the capacitor 49 dissipate its energy slowly, over a multiple number of cycles of decaying oscillation.

The circuitry that controls the triggering of the SCRs 34 or 35 ensures that once the oscillatory discharge is set in motion (by initially firing an SCR), the combination of SCRs 34 and 35 are then kept in essentially continuous conduction (i.e., without the instantaneous blocking voltage applied to them being allowed to rise above a few volts), until the oscillation has been completed.

Without this feature, the "internally generated" oscillation would be reflected from the ISP 30 back to the connected system, rather than being kept as an "internal event" within the ISP. Since the purpose of the ISP is to be a passive blocking/shunting device as far as the external system is concerned, it is undesirable that the internal oscillatory discharge of the capacitor 49 should be "seen" by the external system.

After the oscillation is finished, the SCR 34 is only fired by first time conditions. A first time firing is specifically described as follows. When 300 volts occurs over the nodes A and B, the output of 300 volt comparator 142 is a logic high. When the output of the 300 volt comparator 142 is a logic high, the output of OR gate 144 is a logic high. This logic high signal is provided for 80 milliseconds by the timer 148 and provided to AND gate 150. The output of the 5 volt comparator 140 is also provided to AND gate 150. When the timer 148 and the 5 volt comparator 140 both provide a logic high to the AND gate 150, the AND gate 150 provides a logic high to drive pulse generator 152. In response to the signal from the output of the AND gate 150, the drive pulse generator 152 provides a 30 microsecond drive pulse to the SCR 34. Thus, whenever the SCR 34 voltage exceeds 300 volts, a first pulse is delivered to its gate, turning it ON. Within the subsequent 80 millisecond period set by the timer 148, the SCR 34 is fired whenever its voltage exceeds 5 volts, ensuring that the voltage across the SCR 34 will not exceed 5 volts while the capacitor 49 completes its oscillatory discharge. The output of the 300 volt comparator 142 is provided to a similar OR gate through a level shifter in logic and drive circuit 112 similar to the level shifter 146, starting a similar 80 millisecond timer for the SCR 35 and enabling it to be fired whenever its voltage attempts to exceed 5 V.

The OR gate 144 also provides a logic high to the timer 148 when either the AND gate 162 or the level shifter 146 provides a logic high. The level shifter 146 provides a logic high when a 300 volt comparator in the logic and drive circuit 112, which is similar to the comparator 142, outputs a logic high. This later event ensures that the AND gate 150 is enabled for an 80 millisecond period following first-time firing of the SCR 35, should this SCR be the first SCR to be fired, in readiness for the above-described oscillatory current discharge of the capacitor 49 to reverse polarity and require the SCR 34 to conduct.

The IGBT 128 is also controlled by the logic and drive circuit 114. The IGBT 128 is turned ON when the SCR 34 becomes stuck in a conduction state by an external power source. The AND gate 166 operates to turn IGBT 128 ON. Specifically, the pulse generator 151 supplies a pulse of about 300 microseconds duration 100 milliseconds after the last firing pulse to the SCR 34 produced by AND gate 150. Thus, the AND gate 166 is enabled by the pulse generator 151 100 milliseconds after the SCR 34 receives its last pulse.

The AND gate 168 provides a logic high to the AND gate 166 whenever the comparators 156 and 158 simultaneously provide logic highs. The comparator 156 provides a logic high to AND gate 168 when the voltage across nodes A and B is greater than 0.3 volts. The comparator 158 provides a logic high whenever the voltage across nodes A and B is less than 3 volts. Thus, the AND gate 168 provides a logic high when the voltage across nodes A and B is between 0.3 volts and 3 volts. When both AND gate 168 and delay circuit 151 output a logic high, the AND gate 166 outputs a logic high to the one millisecond monostable 157.

The one millisecond monostable 157 provides an output high signal for a set period of 1 millisecond which is a sufficient time to ensure that the SCR 34 turns OFF. The output of the 1 millisecond monostable is provided through the resistor 170 and turns the IGBT 128 ON. At the end of the 1 millisecond period, the output of the monostable 157 goes low and turns OFF the IGBT 128.

This signal is also provided through delay circuit 164 to the AND gate 162 after a 5 microsecond delay. The AND gate 162 provides a logic high signal to FET 172 when the voltage across the IGBT 128 is greater than 5 volts and the delay circuit 164 outputs a logic high. The AND gate 162 turns the FET 172 ON and hence turns the IGBT 128 OFF if the voltage across the IGBT becomes greater than 5 volts after a period of 5 microseconds from the turning ON of the IGBT 128. The AND gate 162 also provides the signal to the OR gate 144. The signal provided to the OR gate 144 refires the SCR 34 if the IGBT 128 is "prematurely" turned OFF due to the voltage across it becoming greater than 5 V during its otherwise intended conduction period. The AND gate 162 ensures that excessive currents are not driven through the IGBT 128.

The operation of logic and drive circuit 114 ensures that the IGBT is driven appropriately. Specifically, the logic and drive circuit 114 drives the IGBT 128 when a bypass closure of the IGBT 128 has not taken place since the last firing pulse provided by the drive pulse circuit 152, no gate drive pulses from circuit 152 have occurred within 100 milliseconds, and the voltage across nodes A and B is less than approximately 3.0 volts positive but greater than 0.3 volts positive. The no bypass closure condition ensures that unnecessary closures of the IGBT 128 do not take place when SCR 34 or SCR 35 is already providing the blocking function between nodes A and B. The 100 millisecond condition ensures that the IGBT 128 is activated only when an SCR is "stuck" in conduction due to DC follow current from an external supply. The less than 3.0 volts positive and greater than 0.3 volts positive condition ensures that the IGBT 128 is turned ON only when the SCR 34 is in conduction. Turning ON the IGBT 128 when the SCR 35 is conducting, which would be represented by a negative voltage across nodes A and B, therefore less than 0.3 V positive, may produce undesirable high circulating current.

Typically, the IGBT 128 and the IGBT 130 could each be comprised of 6 parallel IRGPC50F 70 Amp, 600 volt IGBT's or 10 parallel IRGBC40F 49 Amp, 600 volt IGBT's. The IGBTs 128 and 130 could also typically be each comprised of a single high current IGBT module rated at several hundred amps. With reference to the foregoing description of FIG. 13, it is understood as with the circuits in all the figures that the operating levels, component selection and timing periods could be widely different without alternating the basic principles of the circuit 110.

Figure 14:
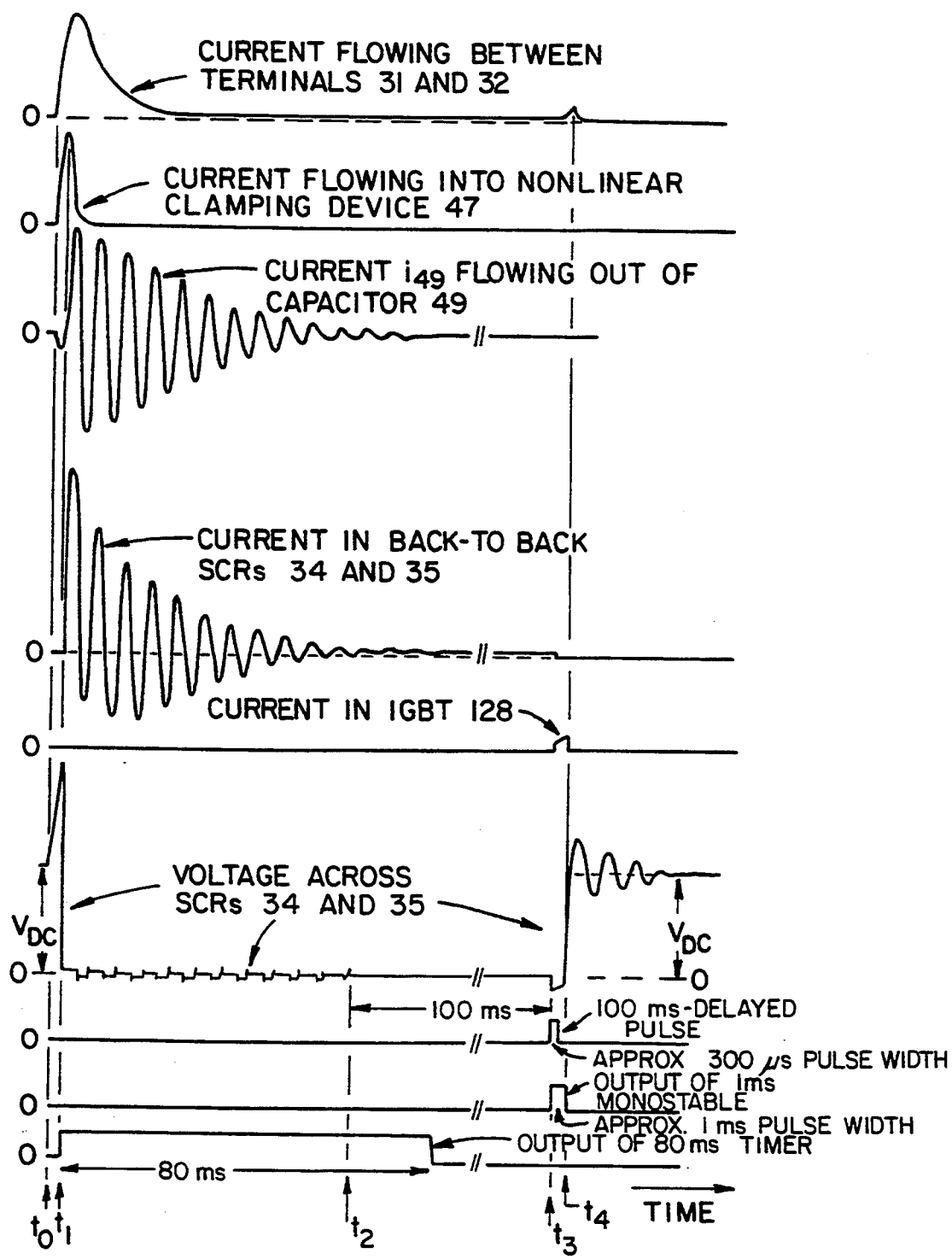
FIG. 14 is a waveform illustrating the operation of the non-autonomous high voltage isolator surge protector.

Operation of the circuits of FIG. 13 is illustrated diagrammatically in FIG. 14. Prior to time $t_0$, the ISP has a DC bias voltage $V_{DC}$ applied, and the forward blocking voltage across the SCR 34 is $V_{DC}$. At time $t_0$, a surge current flows into the ISP. As a result of this current, the voltage across SCR 34 increases.

At time $t_1$, the voltage across SCR 34 reaches the trigger level, which typically could be several hundred to several thousand volts, and SCR 34 turns ON. The output of the 80 millisecond timer 148 assumes a logic high at time $t_1$, and the capacitor 49 proceeds to resonate with the inductor 48A, producing an underdamped oscillating current throughout the period $t_1$ to $t_2$. This current flows freely through the back-to-back SCRs 34 and 35, each SCR commencing conduction as soon as its anode voltage reaches a voltage of about 5 V, in each successive half-cycle.

The total current through the SCRs is the sum of the applied fault current and the oscillating current in capacitor 49. At time $t_2$, the SCR 34 turns on for the "final" time, the current in this SCR now becoming unidirectional as a result of the DC current flowing into the ISP 30.

The 100 millisecond-delayed pulse circuit 151 starts a fresh time-out period as each SCR firing pulse is initiated. Since no SCR firing pulses occur after time $t_2$, the output of the 100 millisecond delayed pulse circuit 151 assumes a logic high at time $t_3$, which occurs approximately 100 milliseconds after time $t_2$.

The duration of the logic high pulse of the 100 millisecond delayed pulse circuit is about 300 microseconds. During this period the AND gate 166 is enabled. The output of AND gate 168 is already high at time $t_3$, because the voltage across SCR 34 at this time falls within a 0.3 to 3.0 V window. Therefore, the output of AND gate 166 assumes a logic high value at time $t_3$, the output of the 1 millisecond monostable assumes a logic high value, and the IGBT 128 is turned on. The voltage across SCR 34 is now reversed by the DC bias voltage across the capacitor 132, and the current in SCR 34 diverts into the IGBT 128.

During the period $t_3$ to $t_4$, the current flowing in IGBT 128 increases, as capacitor 132 sends a charging current into capacitor 49, as well as into the external system. At time $t_4$ the 1 millisecond monostable times-out, the drive voltage is removed from IGBT 128, which turns off, and the voltage across the SCR 34 starts to re-establish to the applied DC value, $V_{DC}$.

Figure 15:
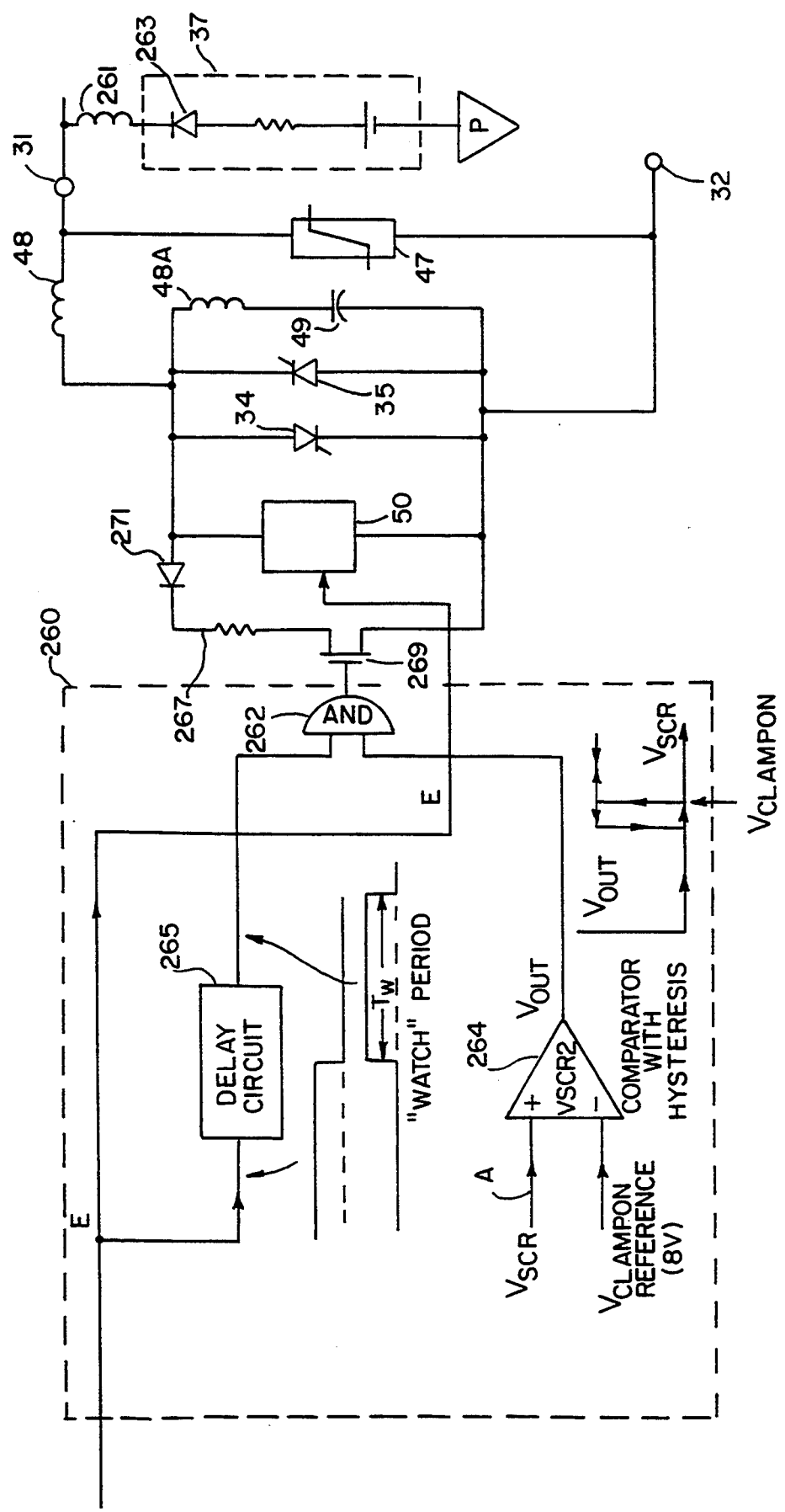
FIG. 15 is a functional schematic of a voltage clamp circuit which may be used with the isolator surge protector of the invention.

With reference to FIG. 15, a portion of an ISP circuit includes a shunt path comprising a MOSFET 269, a resistor 267 and a diode 271 which may be used with the bypass circuit 50 in an ISP. The shunt path is controlled by a circuit 260. ISPs are susceptible to a pumped up voltage across nodes A and B from inductance associated with the external voltage source 37 represented by an inductor 261 in FIG. 15, as well as the internal inductance of the ISP, which will contain energy when the bypass circuit 50 turns the current OFF.

This stored energy can generate a voltage across the nodes A and B which can retrigger the SCR 34 after the bypass circuit 50 turns OFF the SCR 34. Thus, the inductor 261 can cause a continuous repeating cycle of operation under which the SCR 34 repeatedly turns ON and OFF.

The circuit 260 includes an AND gate 262, a comparator 264, and a delay circuit 265. The FET 269 could be replaced by an IGBT or other type of switching device. The diode 263 is not a necessary part of the supply 37. The delay circuit 265 receives a signal at node E from the logic and drive circuit 52 within the bypass circuit 50 (FIG. 3). The signal at node E turns the bypass switch ON and OFF as described above. When the signal turns the bypass switch from ON to OFF, the delay circuit 265 provides a logic high to the AND gate 262. The signal from the delay circuit 265 provides a "watch period" which enables the AND gate 262. If the voltage across the SCR 34 becomes greater than a preset reference voltage which would typically be about 8 V for the bypass circuit 80 of FIG. 11, and typically several hundred volts for the bypass circuit 110 of FIG. 13, the comparator 264 provides a logic high to the AND gate 262. The AND gate 262 outputs a logic high to the FET 269.

When the FET 269 is turned ON, a shunt path or clamp circuit including the resistor 267 and FET 269 is provided between the nodes A and B and the resistor 267 shunts the current across the node A and the node B. The shunt path arrests the rise of voltage across the node A and the node B. Thus, the inductor 261 is not able to retrigger the SCR 34. The resistor 267 is sized so that the combined voltage developed across it, the transistor 269 and the diode 271 with maximum DC follow current flowing through it is less than the level which switches the output of comparator 264 to a logic high. When the voltage across the nodes A and B falls below a voltage which is less than the above preset voltage reference, the comparator 264 outputs a logic low and the AND gate 262 turns OFF the FET 269.

The comparator 264 is designed with hysteresis to provide proper operation. For example, the comparator 264 provides a logic high when the voltage across the SCR 34 is greater than 8 volts. The comparator 264 provides the logic high until the voltage at the positive input falls below 7.5 volts. The resistor 267 may be successively connected and disconnected multiple times within the "watch period", as energy from the inductor 261 successively pumps up the voltage across the capacitor 49, the FET 269 is turned on, the capacitor 49 discharges into the resistor 267, the MOSFET 269 is turned off, and the cycle repeats until all the energy stored in the inductor 261 is dissipated.

The circuit 260 is typically designed with the following performance specifications. The nominal SCR trigger value of the ISP circuit is 12 volts, the maximum DC bias voltage in source 37 is 5 volts, the maximum DC bias current is 40 amps, the maximum value of the inductance 261 of the circuit external to the ISP is 25 millihenries, and the minimum value of the capacitor 49 of the ISP is 10,000 μF. The value of the resistor 267 is typically 0.15 ohms. Typically, the delay circuit 265 provides a watch period of at least 400 milliseconds. In general, the duration of the watch period is set to ensure that all energy stored in the inductor 261 is dissipated by the operation of the clamp circuit when the inductor 261 and the DC follow current simultaneously have their maximum possible design values.

Figure 16:
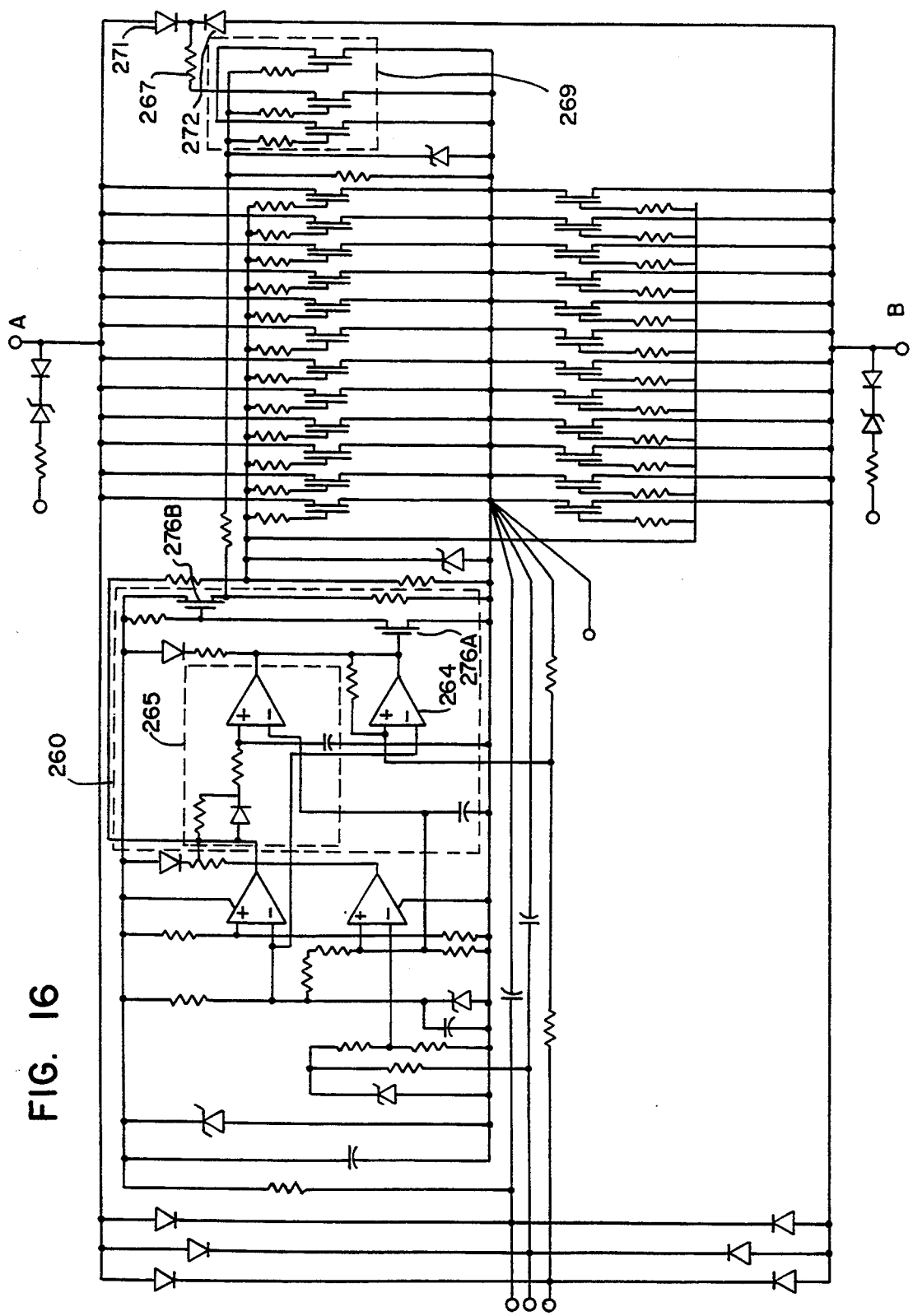
FIG. 16 is a detailed circuit diagram for the isolator surge protector of the present invention including the voltage clamp circuit.

With reference to FIG. 16, a more detailed schematic of the circuit 260 is shown. The circuit is essentially the same as previous bypass circuits discussed with reference to FIG. 11. Only the additional circuitry associated with the circuit 260 is described below.

The circuit further utilizes three MOSFETs which operate to provide the function of the FET 269 discussed with reference to FIG. 15. Typically, the comparator 264 and the delay circuit 265 are comprised of LP339 open collector comparators. As described with reference to FIG. 11, the AND gate 162 can be eliminated if these components are used.

The three MOSFETs representing the FET 169 are coupled to a diode 271, a diode 272 and a resistor 267. The MOSFETs are controlled by FET transistors 276A (N-channel) and 276B (P-channel) coupled to the comparator 264 and the delay circuit 265.

Figure 17:
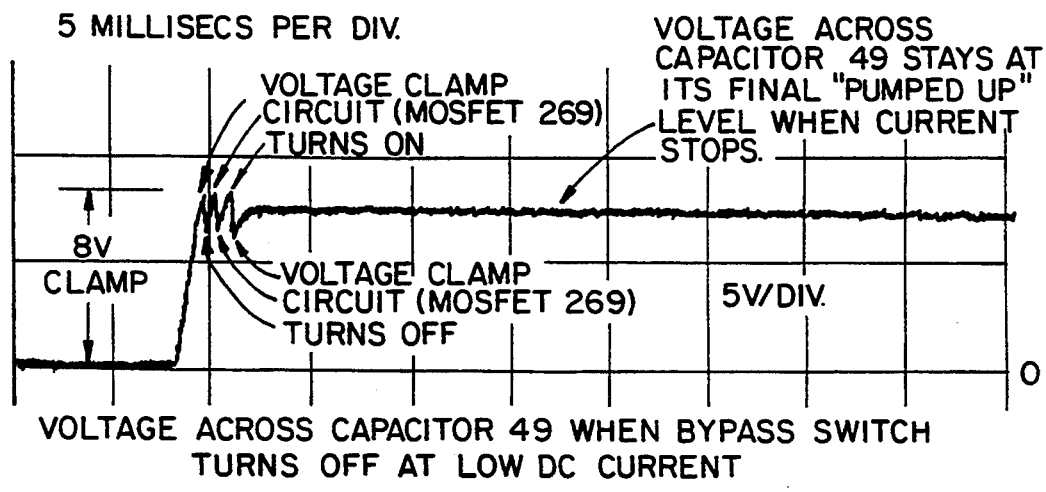
FIG. 17 is an illustrative waveform of the voltage across the capacitor when the bypass switch turns off at low DC current.
Figure 18:
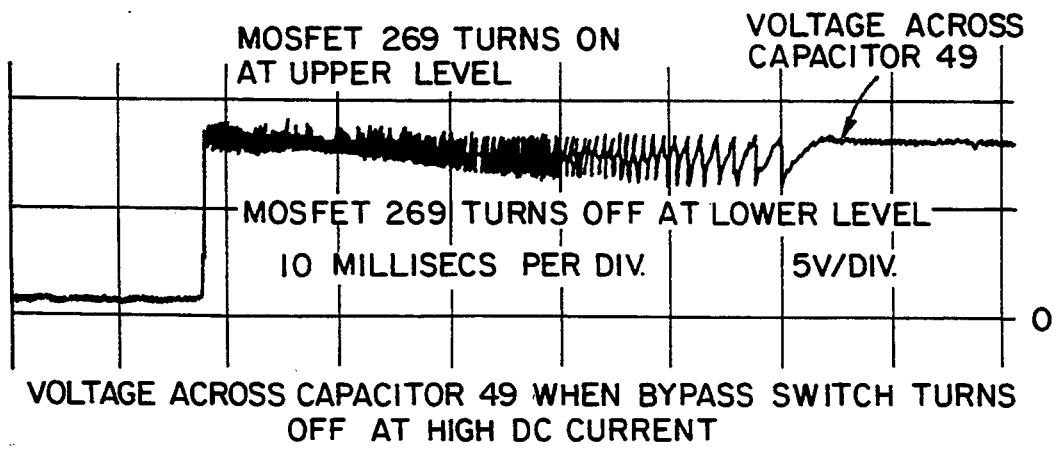
FIG. 18 is an illustrative waveform of the voltage across the capacitor when the bypass switch turns off at high DC current.

The operation of the circuit 260 of FIG. 16 is illustrated in FIGS. 17 and 18, which show waveforms of the voltage across the bypass switch after it turns off and the voltage clamp circuit 260 is activated, due to energy stored in the DC source inductance 261.

The waveforms in FIG. 17 are for a relatively low value of DC follow current. The clamp circuit switches on and off just three times, before the energy in the DC source inductor 261 is exhausted.

The waveforms in FIG. 18 are for a much higher value of DC follow current. The clamp circuit switches on and off multiple times before the energy in the DC source inductance 261 is exhausted.

Figure 19:
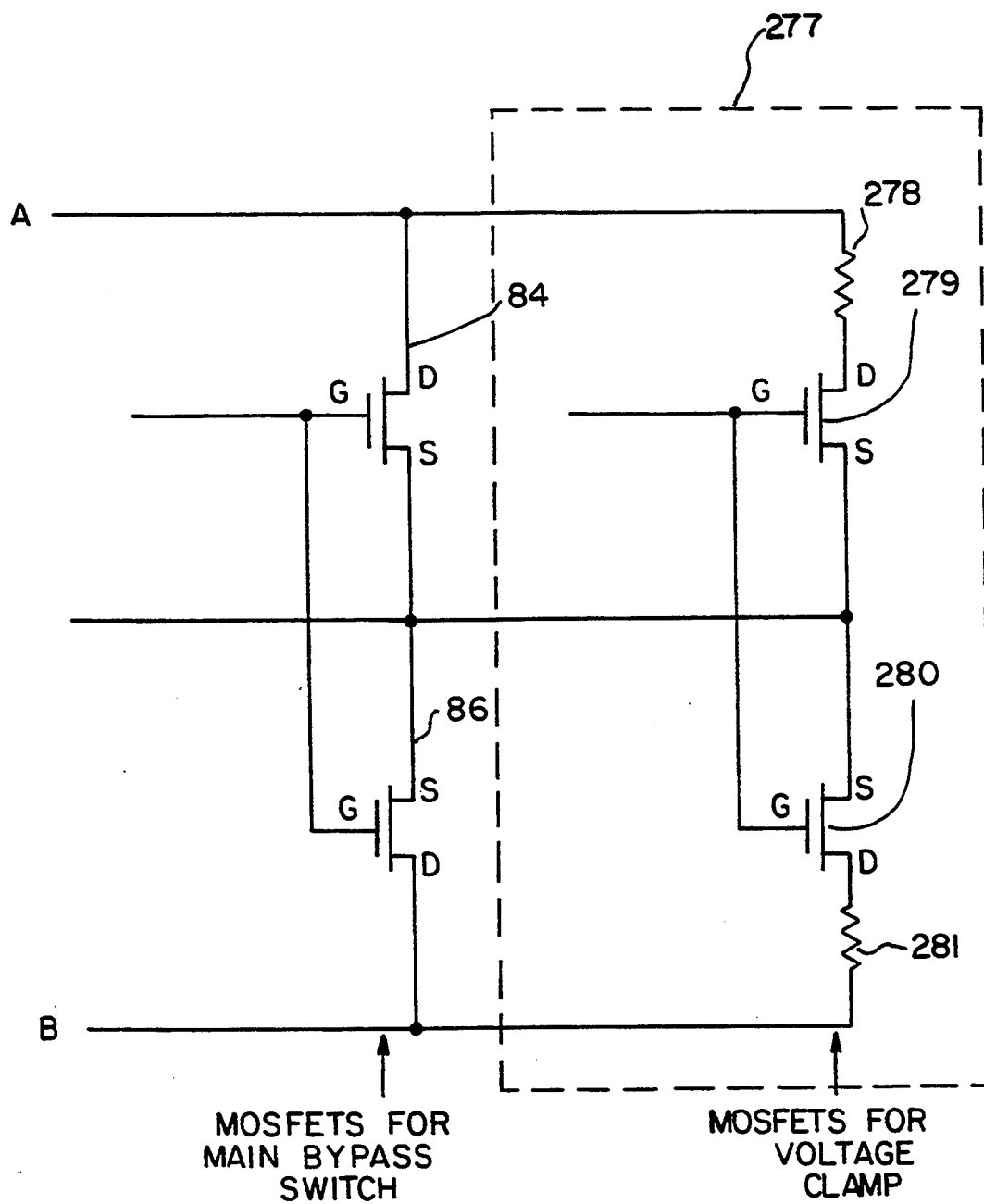
FIG. 19 is a circuit schematic of an alternative voltage clamp circuit for the isolator surge protector.

With reference to FIG. 19, an alternative voltage clamp circuit 277 for use with a bypass circuit such as circuit 80 discussed with reference to FIG. 10 is shown. The alternative clamp circuit includes a resistor 278, a MOSFET 279, a MOSFET 280, and a resistor 281. The MOSFET 84 and MOSFET 86 each belong to the main bypass switch as shown in FIG. 10. The clamp circuit could be used to replace the FET 269 and resistor 267 and the diodes 271 and 272 shown in FIG. 16. The circuit 277 utilizes two MOSFETs and eliminates the diodes 271 and 272 in the bypass path in FIG. 16.

Figures 20, 21, 22:
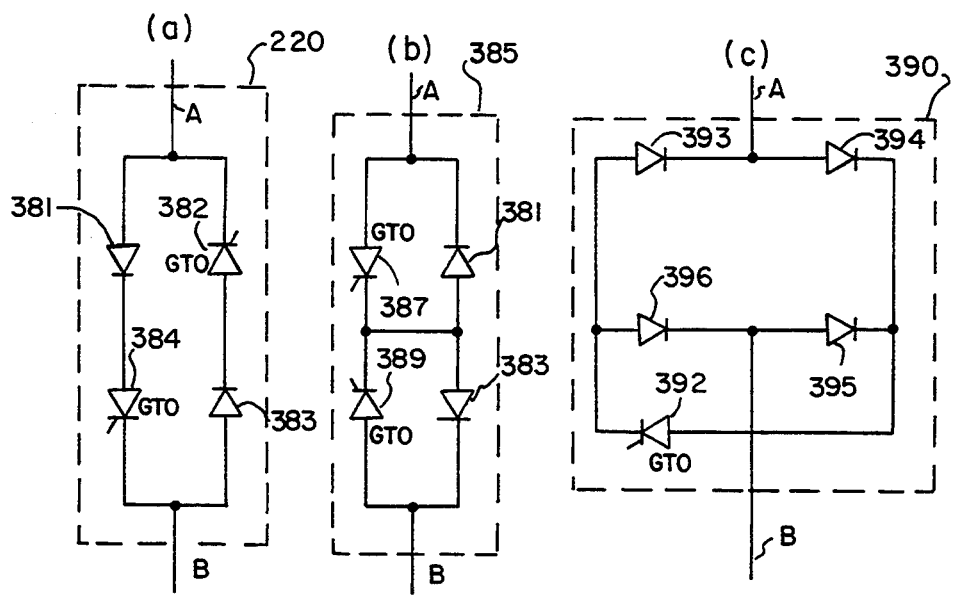
FIGS. 20–22 are schematics of alternative circuits for providing reverse blocking capability in an isolator surge protector of the invention using an asymmetrical GTO.

With reference to FIGS. 20 through 22, alternative embodiments of ISPs are shown which utilize asymmetrical gate turn off thyristors (GTOs). GTOs are commercially available with forward voltage ratings of up to 4500 volts and rated peak turn off current up to several 1000 amperes.

With reference to FIG. 20, GTOs 382 and 384 replace SCRs 34 and 35 in an ISP similar to the ISP 30 discussed with reference to FIGS. 1–19. The GTOs 382 and 384 can be turned OFF by applying a negative pulse of current at the gate. Thus, the use of a GTOs 384 and 382 eliminates the need for a turn off circuit such as the turn off circuit 50 discussed with reference to FIG. 3. In the main ISP switch 220, a logic and drive circuit would be used to produce a negative gate pulse for turning OFF GTOs 382 and 384 when the surge condition has passed.

With reference to FIG. 21, a further main ISP switch 385 is shown which utilizes a GTO 387, a GTO 389, a diode 381 and a diode 383. With reference to FIG. 22, a further embodiment of a main ISP switch 390 is shown utilizing one GTO 392, and full bridge of diodes 393, 394, 395, and 396. Alternatively, each of the GTOs in FIGS. 20 through 22 could be substituted by functionally similar devices such as static induction thyristors or mos-controlled thyristors.

The circuits 220, 385 and 390 are also applicable in providing a bypass circuit for geomagnetically induced current. In such applications, the required blocking voltage may be in the range of several thousand volts. These types of circuits could be applied in a manner similar to that of the circuit discussed with reference to FIG. 12; however, GTOs would be used rather than SCRs and IGBTs. The disadvantages of using GTOs is that they are of higher cost and have lower overall current ratings and lower surge current ratings. Further, the reverse voltage blockage of a GTO is generally significantly less than an SCR and the drive current provided at the gates of the GTOs is greater, especially for turning OFF the GTO. Diodes 381 and 383 and the diodes 393, 394, 395 and 396 may be utilized to provide reverse voltage blocking capacity.

Figure 23:
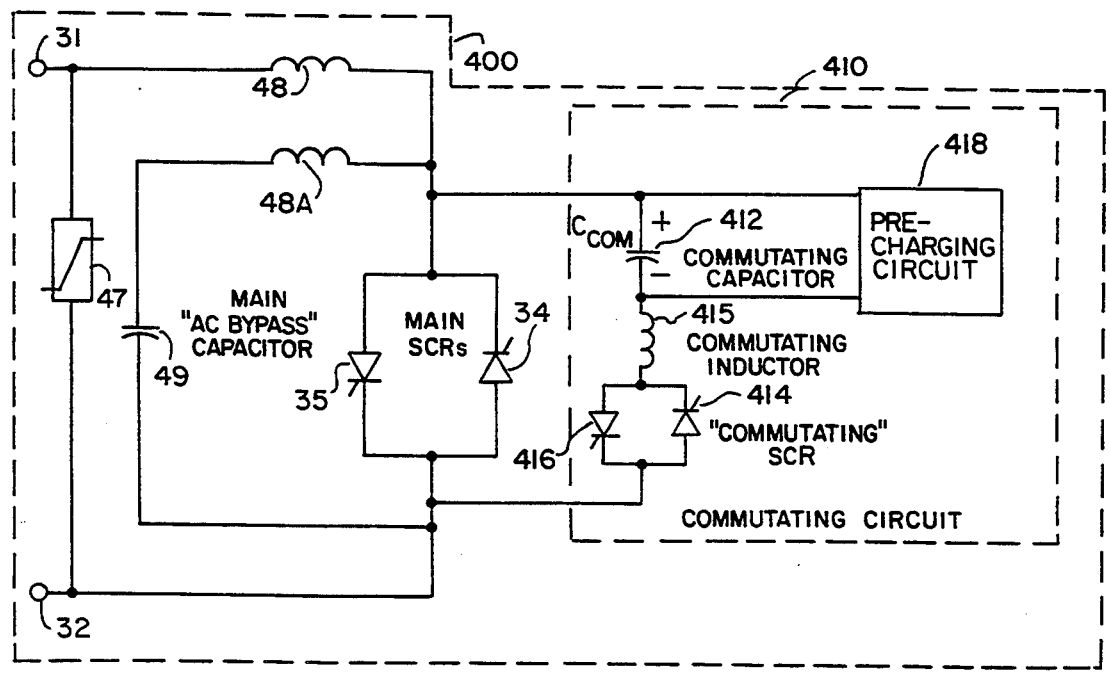
FIG. 23 is a simplified circuit diagram for an auxiliary commutating circuit using SCRs in an isolator surge protector of the invention.

With reference to FIG. 23, an ISP 400 is shown which utilizes a turn off circuit 410 which turns off the main SCRs 34 and 35. The turn off circuit 410 includes a commutating capacitor 412, a commutating SCR 414, a commutating inductor 415, and a commutating SCR 416. When a logic and drive circuit similar to the logic and drive circuit 52 or 112 and 114 determines that one of the SCRs should be turned OFF, the logic and drive circuit fires the commutating SCRs 414 and 416. The precharged commutating capacitor 212 is precharged by a precharging circuit 418. A local resonating alternating current powered by the capacitor 412 is produced across the SCRs 34 and 35, which turns off the appropriate SCRs 34 or 35.

The values shown in the various figures are preferred values for a particular embodiment and are not shown in any limiting sense. The various signal levels are also preferred values and are not shown in any limiting sense. Various other values or package types could be utilized.

It is understood that the invention is not confined to the particular construction and arrangement of parts herein illustrated and described, but embraces all such modified forms thereof as come within the scope of the following claims.

What is claimed is:

1. A bypass circuit for an isolator surge protector in an electrical system, the isolator surge protector of the type having two terminals and at least one thyristor which provides a low impedance conduction path between the terminals of the isolator surge protector in response to a surge condition, and the electrical system of the type having an external DC bias circuit, the bypass circuit comprising:
    (a) switch means responsive to a control signal for providing a low impedance bypass path across the at least one thyristor;
    (b) control means for generating the control signal to provide the bypass path a selected period of time after the voltage across the at least one thyristor falls below and remains below a first predetermined level after exceeding that level, the first predetermined level indicative of a surge condition, and for removing the control signal after a limited period of time so that the switch means no longer provides a low impedance bypass path across the at least one thyristor.

2. The bypass circuit of claim 1 wherein the control means is autonomous and includes a diode and a capacitor connected across the thyristor, wherein the control means is powered by energy stored in the capacitor from a voltage surge which provides current through the diode into the capacitor.

3. The bypass circuit of claim 1, wherein the control means provides the control signal only if the voltage across the thyristor is below a second predetermined level and removes the control signal if the voltage across the thyristor rises above the second predetermined level.

4. The bypass circuit of claim 1 wherein isolator surge protector includes two thyristors connected in anti-parallel, and wherein the switch means in the bypass path includes two MOSFETs, with integral diodes, connected in series opposition such that the bypass path can be established through the MOSFETs across either of the thyristors for bypass of current flow through either of the thyristors.

5. The bypass circuit of claim 1 wherein the control means is autonomous and includes a current transformer connected to feed energy to a capacitor from current flowing through the isolator surge protector for powering the control means from energy stored in the capacitor.

6. The bypass circuit of claim 1 wherein the bypass path has a lower voltage drop than the turnoff voltage of the at least one thyristor.

7. The bypass circuit of claim 1 wherein the bypass path includes an independent voltage source and wherein the switch means is operable to apply the voltage from the voltage source across the at least one thyristor to turn off the thyristor.

8. The bypass circuit of claim 1 wherein the switch means comprises at least one MOSFET and a diode connected in series across the at least one thyristor.

9. The bypass circuit of claim 8 wherein the switch means comprises a plurality of MOSFETs connected in parallel with each other and in series with the diode across the at least one thyristor.

10. The bypass circuit of claim 1 wherein the control means includes a first diode and a first capacitor connected across the at least one thyristor so that voltages across the thyristor may be applied through the connected to receive the voltage across the first capacitor at one input and a reference voltage at another input and providing a high output signal when the voltage across the first capacitor is below the reference voltage, and wherein the control means provides the control signal for a limited period of time when the output signal from the first comparator is present.

11. The bypass circuit of claim 10 including a second diode and a second capacitor connected across the at least one thyristor so that voltages across the thyristor may be applied through the second diode to the second capacitor, a second comparator connected to receive the voltage across the second capacitor at one input and a reference voltage at its other input and providing a high output signal if the voltage across the second capacitor is greater than the reference voltage, and further including an AND gate means for receiving the output of the first and second comparators and providing a high output when the outputs of the first and second comparators are both high, the output of the AND gate means provided as the output signal to the switch means such that the switch means provides the low impedance path when the output of the AND gate means is high.

12. The bypass circuit of claim 11 wherein the discharge time constant for the second capacitor is substantially longer than the discharge time constant for the first capacitor.

13. The bypass circuit of claim 1 including voltage clamp means for limiting the voltage across the thyristor to prevent unnecessary switching of the thyristor because of transient currents within the isolator surge protector.

14. The bypass circuit of claim 13 wherein the voltage clamp means includes a resistor and a controllable switch connected in series across the thyristor, and further includes a controller to control the controllable switch to turn on when the thyristor is off and the voltage across the thyristor increases to a first threshold which is indicative of a transient current and to turn off when the voltage across the thyristor decreases to a second threshold.

15. The bypass circuit of claim 14 wherein the controller controls the controllable switch to turn on only within a predetermined time period that immediately follows opening of the bypass path.

16. A method of controlling an electrical power isolation and surge protection system having a DC power source providing a DC bias voltage to a DC isolated structure, and an isolator surge protector including a high speed triggerable electronic switch for selectively providing a conductive path between the isolated structure and ground, comprising the steps of:
 (a) turning the high speed triggerable electronic switch ON when the voltage across the switch reaches a level indicative of a surge condition to shunt surge current from the isolated structure to ground; and
 (b) turning the high speed triggerable electronic switch OFF when the current in the switch becomes continuous DC current which falls below and remains below a selected level and which is supplied from the DC power source.

17. The method of claim 16 wherein the switch is a gate turn off switch and the step of turning the switch OFF includes providing a negative gate pulse to the switch.

18. The method of claim 16 wherein the switch is a thyristor and the step of turning the switch OFF includes providing a low impedance path across the switch so that the voltage is reduced below the turn off voltage of the thyristor.

19. The method of claim 16 wherein the switch is a thyristor and the step of turning the switch OFF includes providing a reverse bias turnoff voltage to the thyristor so that the voltage across the thyristor is at least reduced below the turnoff voltage of the switch or reversed.

20. An isolator surge protector, comprising:
 (a) two terminals and a pair of thyristors connected in anti-parallel across the two terminals;
 (b) means for triggering conduction of the thyristor which has a forward voltage across it which exceeds a predetermined level indicative of a surge condition;
 (c) switch means responsive to a control signal for providing a low impedance bypass path across at least one of the thyristors;
 (d) control means for generating the control signal to provide the bypass path a selected period of time after the voltage across the at least one thyristor falls below and remains below a first predetermined level after exceeding that level, the first predetermined level indicative of a surge condition, and for removing the control signal after a limited period of time so that the switch means no longer provides a low impedance bypass path across the at least one thyristor.

21. The isolator surge protector of claim 20 wherein the control means is autonomous and includes a diode and a capacitor connected across the thyristor, wherein the control means is powered by energy stored in the capacitor from a voltage surge which provides current through the diode into the capacitor.

22. The isolator surge protector of claim 20, wherein the control means provides the control signal only when the voltage across the thyristor is below a second predetermined level and removes the control signal when the voltage across the thyristor rises above the second predetermined level.

23. The isolator surge protector of claim 20 wherein the isolator surge protector includes two thyristors connected in anti-parallel, and wherein the switch means in the bypass path includes two MOSFETs, with integral diodes, connected in series opposition such that the bypass path can be established through the MOSFETs across either of the thyristors for bypass of current flow through either of the thyristors.

24. The isolator surge protector of claim 20 wherein the control means is autonomous and includes a current transformer connected to feed energy to a capacitor from current flowing through the isolator surge protector for powering the control means from energy stored in the capacitor.

25. The isolator surge protector of claim 20 wherein the bypass path has a lower voltage drop than the turn-off voltage of the at least one thyristor.

26. The isolator surge protector of claim 20 wherein the bypass path includes an independent voltage source and wherein the switch means is operable to apply the voltage from the voltage source across the at least one thyristor to turn off the thyristor.

27. The isolator surge protector of claim 20 wherein the switch means comprises at least one MOSFET and a diode connected in series across the at least one thyristor.

28. The isolator surge protector of claim 27 wherein the switch means comprises a plurality of MOSFETs connected in parallel with each other and in series with the diode across the at least one thyristor.

29. The isolator surge protector of claim 20 wherein the control means includes a first diode and a first capacitor connected across the at least one thyristor so that voltages across the thyristor may be applied through the first diode to the first capacitor, and a first comparator connected to receive the voltage across the first capacitor at one input and a reference voltage at another input and providing a high output signal when the voltage across the first capacitor is below the reference voltage, and wherein the control means provides the control signal for a limited period of time when the output signal from the first comparator is present.

30. The isolator surge protector of claim 29 including a second diode and a second capacitor connected across the at least one thyristor so that voltages across the thyristor may be applied through the second diode to the second capacitor, a second comparator connected to receive the voltage across the second capacitor at one input and a reference voltage at its other input and providing a high output signal if the voltage across the second capacitor is greater than the reference voltage, and further including an AND gate means for receiving the output of the first and second comparators and providing a high output when the outputs of the first and second comparators are both high, the output of the AND gate means provided as the output signal to the switch means such that the switch means provides the low impedance path when the output of the AND gate means is high.

31. The isolator surge protector of claim 30 wherein the discharge time constant for the second capacitor is substantially longer than the discharge time constant for the first capacitor.

32. The isolator surge protector of claim 20 including voltage clamp means for limiting the voltage across the thyristor to prevent unnecessary switching of the thyristor because of transient currents within the isolator surge protector.

33. The isolator surge protector of claim 32 wherein the voltage clamp means includes a resistor and a controllable switch connected in series across the thyristor, and further includes a controller to control the controllable switch to turn on when the thyristor is off and the voltage across the thyristor increases to a first threshold which is indicative of a transient current and to turn off when the voltage across the thyristor decreases to a second threshold.

34. The isolator surge protector of claim 33 wherein the controller controls the controllable switch to turn on only within a predetermined time period that immediately follows opening of the bypass path.

35. The isolator surge protector of claim 20 including an AC bypass capacitor connected between the terminals of the isolator surge protector.

36. An isolator surge protector comprising:
(a) two terminals and a pair of thyristors connected in anti-parallel across the two terminals;
(b) an AC bypass capacitor connected between the two terminals and an inductor connected in series with the AC bypass capacitor and the pair of thyristors;
(c) control means for triggering conduction of the thyristor which has a forward voltage across it which exceeds a predetermined level indicative of a surge condition and further responsive to the voltage across the thyristors for turning the thyristors on for a predetermined period of time after the thyristor was first turned on so that energy stored in the bypass capacitor can be dissipated, wherein the control means keeps at least one of the thyristors in conduction at a time so that the bypass capacitor is oscillatorily discharged.

37. An isolator surge protector, comprising:
(a) two terminals and a pair of thyristors connected in anti-parallel across the two terminals;
(b) means for triggering conduction of the thyristor which has a forward voltage across it which exceeds a predetermined level indicative of a surge condition;
(c) switch means responsive to a control signal for providing a low impedance bypass path across at least one of the thyristors;
(d) control means for generating the control signal to provide the bypass path when the current in the at least one thyristor becomes continuous DC current which falls below and remains below a selected level to turn off the at least one thyristor, and for removing the control signal after a limited period of time so that the switch means no longer provides a low impedance bypass path across the at least one thyristor.

38. The isolator surge protector of claim 37 wherein the control means includes a first diode and a first capacitor connected across the at least one thyristor so that voltages across the thyristor may be applied through the first diode to the first capacitor, whereby the voltage across the thyristor is related to the current through the thyristor, and a first comparator connected to receive the voltage across the first capacitor at one input and a reference voltage at another input and providing a high output signal when the voltage across the first capacitor is below the reference voltage, and wherein the control means provides the control signal for a limited period of time when the output signal from the first comparator is present.

39. The isolator surge protector of claim 38 including a second diode and a second capacitor connected across the at least one thyristor so that voltages across the thyristor may be applied through the second diode to the second capacitor, a second comparator connected to receive the voltage across the second capacitor at one input and a reference voltage at its other input and providing a high output signal if the voltage across the second capacitor is greater than the reference voltage, and further including an AND gate means for receiving the output of the first and second comparators and providing a high output when the outputs of the first and second comparators are both high, the output of the AND gate means provided as the output signal to the switch means such that the switch means provides the low impedance path when the output of the AND gate means is high.

40. The isolator surge protector of claim 39 wherein the discharge time constant for the second capacitor is substantially longer than the discharge time constant for the first capacitor.

* * * * *

UNITED STATES PATENT AND TRADEMARK OFFICE
CERTIFICATE OF CORRECTION

PATENT NO. : 5,436,786
DATED : July 25, 1995
INVENTOR(S) : Brian R. Pelly, et al.

It is certified that error appears in the above-indentified patent and that said Letters Patent is hereby corrected as shown below:

In column 1, line 33 of the patent, "ion" should be --on--.

In column 11, line 39 of the patent, "56," should be --56. --.

In column 12, line 48 of the patent, "diode 8," should be --diode 98,--.

In column 12, line 49 of the patent, "diode. 96" should be --diode 96--.

In column 14, line 9 of the patent, "of-the" should be --of the--.

UNITED STATES PATENT AND TRADEMARK OFFICE
CERTIFICATE OF CORRECTION

PATENT NO. : 5,436,786
DATED : July 25, 1995
INVENTOR(S) : Brian R. Pelly, et al.

It is certified that error appears in the above-indentified patent and that said Letters Patent is hereby corrected as shown below:

In column 22, line 27 of the patent, --first diode to the first capacitor, and a first comparator-- should be inserted after "through the".

Signed and Sealed this

Ninth Day of July, 1996

Attest:

BRUCE LEHMAN

*Attesting Officer*   Commissioner of Patents and Trademarks